(12) United States Patent
Lin et al.

(10) Patent No.: US 11,366,306 B2
(45) Date of Patent: Jun. 21, 2022

(54) DRIVING CIRCUIT AND DRIVING METHOD THEREOF, AND ELECTROWETTING PANEL AND DRIVING METHOD THEREOF

(71) Applicant: SHANGHAI TIANMA MICRO-ELECTRONICS CO., LTD., Shanghai (CN)

(72) Inventors: Baiquan Lin, Shanghai (CN); Kerui Xi, Shanghai (CN); Feng Qin, Shanghai (CN); Yian Zhou, Shanghai (CN); Xiangjian Kong, Shanghai (CN); Jine Liu, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 494 days.

(21) Appl. No.: 16/458,054

(22) Filed: Jun. 29, 2019

(65) Prior Publication Data
US 2020/0319449 A1    Oct. 8, 2020

(30) Foreign Application Priority Data

Apr. 4, 2019    (CN) .............................. 201910273082

(51) Int. Cl.
*G02B 26/00*    (2006.01)
*G02B 26/10*    (2006.01)

(52) U.S. Cl.
CPC ........... *G02B 26/005* (2013.01); *G02B 26/10* (2013.01)

(58) Field of Classification Search
CPC ......... G09G 2310/0286; G09G 3/3233; G09G 3/3266; G09G 3/20; G09G 3/3677; G09G 2300/0819; G09G 2320/0233; G09G 2330/021; G09G 2300/0842; G09G 2310/08; G09G 2300/0426; G09G 2300/0861; G09G 2310/0262; G09G 3/3225; G09G 2300/0408;
(Continued)

(56) References Cited

U.S. PATENT DOCUMENTS

2019/0043419 A1*    2/2019    Chen .................... G09G 3/3225

FOREIGN PATENT DOCUMENTS

| CN | 103208246 A | 7/2013 |
|---|---|---|
| CN | 103915074 A | 7/2014 |

(Continued)

*Primary Examiner* — Brandi N Thomas
(74) *Attorney, Agent, or Firm* — Anova Law Group, PLLC

(57) ABSTRACT

A driving circuit includes a first signal-input terminal, a second signal-input terminal, a third signal-input terminal, a fourth signal-input terminal, a signal-output terminal, and a voltage-boosting unit including a first module, a second module, a third module, and a first capacitor. The first module transmits the signal at the third signal-input terminal to a first terminal of the first capacitor during a first time period, and blocks signal transmission during a second time period. During the first time period and the second time period, the second module transmits the signal at the third signal-input terminal to the third module to allow the signal at the fourth signal-input terminal to be transmitted to a second terminal of the first capacitor. During a third time period, the second module and the third module both block signal transmission. The first terminal of the first capacitor is connected to the signal-output terminal for output.

7 Claims, 16 Drawing Sheets

(58) Field of Classification Search
CPC ... G09G 2310/0251; G09G 2310/0267; G09G
2320/045; G09G 3/3614; G09G 3/3655;
G09G 3/3696; G09G 2320/043; G09G
3/2011; G09G 3/2014; G09G 3/325;
G09G 2320/0223; G09G 3/36; G09G
2300/043; G09G 2300/0814; G09G 3/30;
G09G 3/32; G09G 3/3208; G09G 3/3291;
G09G 2300/0417; G09G 2300/0852;
G09G 2300/0866; G09G 2310/0243;
G09G 2310/06; G09G 2320/0209; G09G
2320/0219; G09G 2320/0295; G09G
2320/064; G09G 3/3258; G09G 3/3648;
G09G 2300/0809; G09G 2300/0876;
G09G 2310/0237; G09G 2310/0289;
G09G 2310/061; G09G 2320/0252; G09G
2320/029; G09G 2320/0633; G09G
2330/06; G09G 3/006; G09G 3/348;
G09G 3/3659; G09G 3/3688; G09G
2230/00; G09G 2300/0443; G09G
2300/0452; G09G 2300/0465; G09G
2300/0473; G09G 2300/08; G09G
2300/0804; G09G 2300/0828; G09G
2310/0205; G09G 2310/021; G09G
2310/0218; G09G 2310/0235; G09G
2310/0248; G09G 2310/0264; G09G
2310/0275; G09G 2310/0283; G09G
2310/0291; G09G 2310/0294; G09G
2310/066; G09G 2320/041; G09G
2330/02; G09G 2330/022; G09G
2330/023; G09G 2330/12; G09G
2380/08; G09G 3/2003; G09G 3/2022;
G09G 3/2074; G09G 3/2092; G09G 3/22;
G09G 3/292; G09G 3/2942; G09G 3/296;
G09G 3/2965; G09G 3/3241; G09G
3/3275; G09G 3/3283; G09G 3/344;
G09G 3/3666; G09G 3/3674; G02B
26/005; G02B 26/10
See application file for complete search history.

(56) References Cited

FOREIGN PATENT DOCUMENTS

| | | |
|---|---|---|
| CN | 104903003 A | 9/2015 |
| CN | 105797792 B | 12/2017 |
| CN | 108593724 A | 9/2018 |
| CN | 108889350 A | 11/2018 |

\* cited by examiner

During a first time period, transmitting a signal B at the third signal-input terminal to the first terminal of the first capacitor through the first module, transmitting the signal at the third signal-input terminal to the third module through the second module, transmitting a signal A at the fourth signal-input terminal to the second terminal of the first capacitor through the third module, such that an electric potential difference (B-A) is formed between the two terminals of the first capacitor — 101

During a second time period, blocking the transmission of the signal at the third signal-input terminal to the first terminal of the first capacitor through the first module, transmitting the signal at the third signal-input terminal to the third module through the second module, and transmitting a signal A' at the fourth signal-input terminal to the second terminal of the first capacitor through the third module, such that the electric potential of the signal at the first terminal of the first capacitor is raised to (B+(A'-A)) — 102

During a third time period, blocking the transmission of the signal at the third signal-input terminal to the third module through the second module, blocking the transmission of the signal at the fourth signal-input terminal to the second terminal of the first capacitor through the third module, such that the electric potential of the signal at the first terminal of the first capacitor remains at (B+(A'-A)), and is outputted through the signal-output terminal — 103

FIG. 8

| During a first time period, transmitting a signal B at the third signal-input terminal to the first terminal of the first capacitor through the first module, transmitting the signal at the third signal-input terminal to the third module through the second module, transmitting a signal A at the fourth signal-input terminal to the second terminal of the first capacitor through the third module, such that an electric potential difference (B-A) is formed between the two terminals of the first capacitor | 101 |

| During a second time period, blocking the transmission of the signal at the third signal-input terminal to the first terminal of the first capacitor through the first module, transmitting the signal at the third signal-input terminal to the third module through the second module, and transmitting a signal A' at the fourth signal-input terminal to the second terminal of the first capacitor through the third module, such that the electric potential of the signal at the first terminal of the first capacitor is raised to (B+(A'-A)) | 102 |

| During a voltage-stabilizing time period, stabilizing the electric potential of the signal at the second terminal of the first capacitor by the voltage-stabilizing unit, such that the first terminal of the first capacitor maintains a high electric-potential output | 104 |

| During a third time period, blocking the transmission of the signal at the third signal-input terminal to the third module through the second module, blocking the transmission of the signal at the fourth signal-input terminal to the second terminal of the first capacitor through the third module, such that the electric potential of the signal at the first terminal of the first capacitor remains at (B+(A'-A)), and is outputted through the signal-output terminal | 103 |

FIG. 10

DRIVING CIRCUIT AND DRIVING METHOD THEREOF, AND ELECTROWETTING PANEL AND DRIVING METHOD THEREOF

CROSS-REFERENCES TO RELATED APPLICATIONS

This application claims the priority of Chinese patent application No. 201910273082.X, filed on Apr. 4, 2019, the entirety of which is incorporated herein by reference.

FIELD OF THE DISCLOSURE

The present disclosure generally relates to the field of driving technology and, more particularly, relates to a driving circuit and a driving method thereof, and an electrowetting panel and a driving method thereof.

BACKGROUND

Microfluidic technology is an emerging interdisciplinary subject involving chemistry, fluid physics, microelectronics, new materials, biology, and biomedical engineering. The technology can accurately manipulate droplet movement, enable droplet merging and separation, and complete various biochemical reactions, and it is a technique focusing on manipulation of fluids in a micron-scale space. The technology has intersected with disciplines such as chemistry, biology, engineering, and physics, and demonstrated a broad range of applications.

Microfluidic chip is a main platform for microfluidic technology. During biological, chemical and medical analysis processes, the basic operating units such as sample preparation, reaction, separation, and detection can be integrated into a micrometer-scale microfluidic chip. The entire process of analysis can be completed automatically on the microfluidic chip. In recent years, featured with small size, low power consumption, low cost, and less sample and reagent required, microfluidic chips are able to realize various advantages including separate and precise control of droplets, short detection time, high sensitivity, easy integration with other devices, etc. Microfluidic chips are widely used in biology, chemistry, medicine, and other fields.

According to existing technology, a microfluidic device generally includes a control circuit and a plurality of driving electrodes. The control circuit is configured to provide voltages to the plurality of driving electrodes such that an electric field is formed between adjacent driving electrodes. A droplet moves under the driving of the electric field. The control circuit usually uses a passive driving chip, but since the driving ability of the passive driving chip is limited, when a large quantity of chemical micro-reaction or substance detection need to be performed simultaneously, a large number of driving electrodes needs to be disposed. In order to provide signals to so many driving electrodes, the driving chip needs to have many signal channels (pins). However, the current passive driving chips cannot support the demand.

In existing technology, the number of signal channels of the driving chip can be reduced by arranging the driving electrodes and the control circuit into an array. In this case, the driving chip is an active driving chip. However, in existing technology, the driving voltage that can be provided by the active driving chip is quite different from the voltage that is required to drive the droplet to move. Generally, the voltage that is capable of driving the droplet to move is about 50 V. However, according to the driving voltage of the active driving chip in existing technology, a high-voltage driving chip can only provide a driving voltage of about 30 V. As a result, the driving voltage provided by existing active driver chips may be insufficient.

Therefore, how to improve a microfluidic device such that the microfluidic device is capable of performing a large quantity of sample detection and reaction is an urgent problem to be solved in the field. The disclosed driving circuit and the corresponding driving method as well as the disclosed electrowetting panel and the corresponding driving method are directed to solve one or more problems set forth above and other problems in the art.

SUMMARY OF THE DISCLOSURE

One aspect of the present disclosure provides a driving circuit. The driving circuit includes a voltage-boosting unit, including a first module, a second module, a third module, and a first capacitor; and a first signal-input terminal, a second signal-input terminal, a third signal-input terminal, a fourth signal-input terminal, and a signal-output terminal electrically connected to the voltage-boosting unit. The first module is electrically connected to the first signal-input terminal, the third signal-input terminal, and a first terminal of the first capacitor, and is configured to, during a first time period, transmit a signal at the third signal-input terminal to the first terminal of the first capacitor, and during a second time period, block transmission of the signal at the third signal-input terminal to the first terminal of the first capacitor to lock an electric potential of a signal at the first terminal of the first capacitor. The second module is electrically connected to the second signal-input terminal, the third signal-input terminal, and the third module, and is configured to, during the first time period and the second time period, transmit the signal at the third signal-input terminal to the third module, and during a third time period, block transmission of the signal at the third signal-input terminal to the third module. The third module is electrically connected to the second signal-input terminal, the second module, and a second terminal of the first capacitor, and is configured to, during the first time period and the second time period, transmit a signal at the fourth signal-input terminal to the second terminal of the first capacitor to raise the electric potential of the signal at the first terminal of the first capacitor, and during the third time period, block transmission of the signal at the fourth signal-input terminal to the second terminal of the second capacitor to lock an electric potential of a signal at the second terminal of the first capacitor. The first terminal of the first capacitor is electrically connected to the signal-output terminal for outputting a high electric-potential signal.

Another aspect of the present disclosure provides a driving method for a driving circuit. The driving circuit includes a voltage-boosting unit, including a first module, a second module, a third module, and a first capacitor; and a first signal-input terminal, a second signal-input terminal, a third signal-input terminal, a fourth signal-input terminal, and a signal-output terminal electrically connected to the voltage-boosting unit. The first module is electrically connected to the first signal-input terminal, the third signal-input terminal, and a first terminal of the first capacitor. The second module is electrically connected to the second signal-input terminal, the third signal-input terminal, and the third module. The third module is electrically connected to the second signal-input terminal, the second module, and a second terminal of the first capacitor. The first terminal of the first capacitor is electrically connected to the signal-output terminal for outputting a high electric-potential signal. The driving method for the driving circuit includes during a first time period, transmitting a signal B at the third signal-input terminal to the first terminal of the first capacitor through the first module, transmitting the signal B at the third signal-input terminal to the third module through the second module, and transmitting a signal A at the fourth signal-input terminal to the second terminal of the first capacitor through the third module, such that an electric-potential difference formed between two terminals of the first capacitor is (B-A); during a second time period, blocking transmission of the signal at the third signal-input terminal to the first terminal of the first capacitor through the first module to lock an electric potential of a signal at the first terminal of the first capacitor, transmitting the signal at the third signal-input terminal to the third module through the second module, and transmitting a signal A' at the fourth signal-input terminal to the second terminal of the first capacitor through the third module, such that an electric potential of the signal at the first terminal of the first capacitor is raised to (B+(A'-A)); and during a third time period, blocking transmission of the signal at the third signal-input terminal to the third module through the second module, blocking transmission of the signal at the fourth signal-input terminal to the second terminal of the first capacitor through the third module to lock an electric potential of a signal at the second terminal of the first capacitor, such that the electric potential of the signal at the first terminal of the first capacitor remains at (B+(A'-A)), and is outputted through the signal-output terminal, where 0<A<B, and 0<A<A'.

Another aspect of the present disclosure provides an electrowetting panel. The electrowetting panel includes a base substrate, and a plurality of driving units arranged into an array and located on one side of the base substrate, a plurality of scanning-line groups, a plurality of data lines extending along a first direction, and a common signal line. Each scanning-line group of the plurality of scanning-line groups includes a first scanning line and a second scanning line. The first scanning line and the second scanning line both extend along a second direction with the second direction intersecting the first direction. Each driving unit of the plurality of driving units includes a first transistor, a second transistor, a third transistor, a driving electrode, and a first electrode. The driving electrode and the first electrode forms a first capacitor. A gate electrode of the first transistor is electrically connected to the first scanning line, a source electrode of the first transistor is electrically connected to a data line of the plurality of data lines, and a drain electrode is electrically connected to the driving electrode. A gate electrode of the second transistor is electrically connected to the second scanning line, a source electrode of the second transistor is electrically connected to the data line of the plurality of data lines, and a drain electrode of the second transistor is electrically connected to a gate electrode of the third transistor. A source electrode of the third transistor is electrically connected to the common signal line, and a drain electrode of the third transistor is electrically connected to the first electrode.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 8 illustrates a schematic diagram of a working flow of an exemplary driving method for a driving circuit consistent with various embodiments of the present disclosure;

FIG. 10 illustrates a schematic diagram of another working flow of an exemplary driving method for a driving circuit consistent with various embodiments of the present disclosure;

DETAILED DESCRIPTION

Various exemplary embodiments of the present disclosure will now be described in detail with reference to the accompanying drawings. It should be noted that the relative arrangement of the components and steps, numerical expressions and numerical values set forth in the embodiments are not intended to limit the scope of the present disclosure. The following description of the at least one exemplary embodiment is merely illustrative, and by no means can be considered as limitations for the application or use of the present disclosure.

It should be noted that techniques, methods, and apparatuses known to those of ordinary skill in the relevant art may not be discussed in detail, but where appropriate, the techniques, methods, and apparatuses should be considered as part of the specification.

In all of the examples shown and discussed herein, any specific values should be considered as illustrative only and not as a limitation. Therefore, other examples of exemplary embodiments may have different values.

It should be noted that similar reference numbers and letters indicate similar items in subsequent figures, and therefore, once an item is defined in a figure, it is not required to be further discussed or defined in the subsequent figures.

Figure 1:
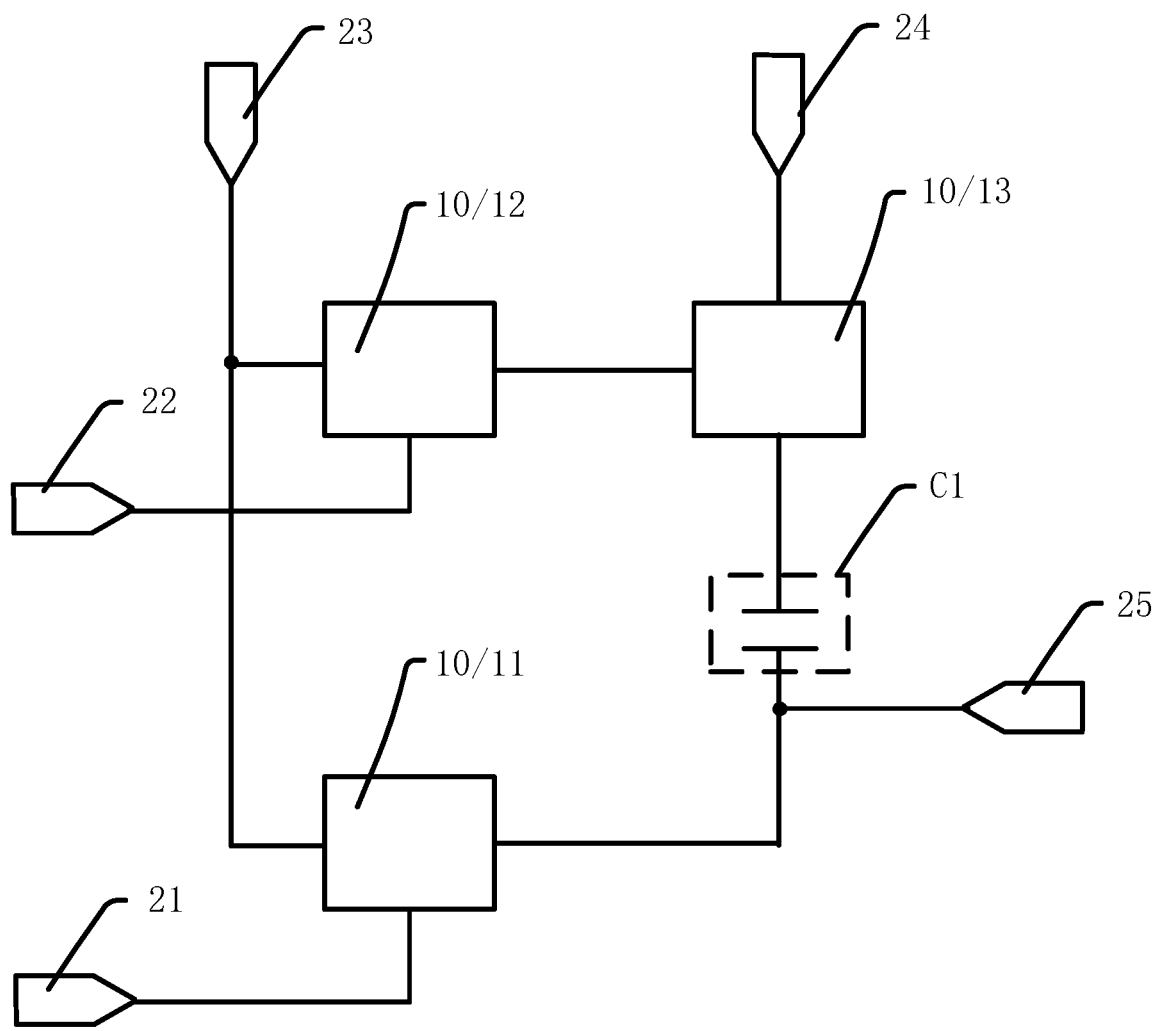
FIG. 1 illustrates a schematic frame structure of an exemplary driving circuit consistent with various embodiments of the present disclosure.

The present disclosure provides a driving circuit. FIG. 1 illustrates a schematic frame structure of an exemplary driving circuit consistent with various embodiments of the present disclosure. Referring to FIG. 1, in one embodiment, the driving circuit may include a voltage-boosting unit 10, a first signal-input terminal 21 electrically connected to the voltage-boosting unit 10, a second signal-input terminal 22, a third signal-input terminal 23, a fourth signal-input terminal 24, and a signal-output terminal 25. The voltage-boosting unit 10 may include a first module 11, a second module 12, a third module 13, and a first capacitor C1 that are electrically connected together.

The first module 11 may be electrically connected to the first signal-input terminal 21, the third signal-input terminal 23, and the first terminal of the first capacitor C1, respectively. During a first time period, the first module 11 may transmit the signal at the third signal-input terminal 23 to the first terminal of the first capacitor C1. During a second time period, the first module 11 may be used to block the transmission of the signal at the third signal-input terminal 23 to the first terminal of the first capacitor C1, such that the electric potential of the signal at the first terminal of the first capacitor C1 may be locked.

The second module 12 may be electrically connected to the second signal-input terminal 22, the third signal-input terminal 23, and the third module 13, respectively. During the first time period and the second time period, the second module 12 may be configured to transmit the signal at the third signal-input terminal 23 to the third module 13. During the third time period, the second module 12 may be used to block the transmission of the signal at the third signal input terminal 23 to the third module 13.

The third module 13 may be electrically connected to the fourth signal-input terminal 24, the second module 12, and the second terminal of the first capacitor C1. During the first time period and the second time period, the third module 13 may be configured to transmit the signal at the fourth signal-input terminal 24 to the second terminal of the first capacitor C1, such that the signal at the first terminal of the first capacitor C1 may be raised. During the third time period, the third module 13 may be configured to block the transmission of the signal at the fourth signal-input terminal 24 to the second terminal of the first capacitor C1, such that the electric potential of the signal at the second terminal of the first capacitor C1 may be locked.

In one embodiment, the first terminal of the first capacitor C1 may be electrically connected to the signal-output terminal 25 for outputting a high electric-potential signal.

For example, during a first time period, the disclosed driving circuit may control the first module 11 to operate in the on state by inputting a signal through the first signal-input terminal 21, transmit the signal at the third signal-input terminal 23 to the first terminal of the first capacitor C1 through the first module 11, control the second module 12 to operate in the on state by inputting a signal through the second signal-input terminal 22, transmit the signal at the third signal-input terminal 23 to the third module 13 through the second module 12, and control the third module 13 to operate in the on state by inputting a signal through the third signal-input terminal 23. As such, the signal at the fourth signal-input terminal 24 may be transmitted to the second terminal of the first capacitor C1 through the third module 13, such that a voltage difference may be generated between the first terminal and the second terminal of the first capacitor C1.

Then, during a second time period, the disclosed driving circuit may control the first module 11 to operate in the off state by inputting a signal through the first signal-input terminal 21, block the transmission of the signal at the third signal-input terminal 23 to the first terminal of the first capacitor C1 through the first module 11, such that the electric potential of the signal at the first terminal of the first capacitor C1 may be locked, transmit the signal at the fourth signal-input terminal 24 to the second terminal of the first capacitor C1 through the third module 13. Because the signal at the fourth signal-input terminal 24 at current time is higher than the signal at the fourth signal-input terminal 24 during the first time period, and the voltage difference between the two terminals of the first capacitor C1 remains unchanged, the electric potential of the signal at the first terminal of the first capacitor C1 may be further improved.

During a third time period, the disclosed driving circuit may transmit the signal at the third signal-input terminal 23 to the third module 13 through the second module 12, control the third module 13 to operate in the off state by inputting a signal through the third signal-input terminal 23, and block the transmission of the signal at the fourth signal-input terminal 24 to the second terminal of the first capacitor C1 through the third module 13, so that the electric potential of the signal at the second terminal of the first capacitor C1 may be locked. Therefore, the signal-output terminal 25 that is electrically connected to the first terminal of the first capacitor C1 may output a high electric-potential signal. As such, the function of low voltage input and high voltage output may be achieved in the driving circuit, which is conducive to realizing the voltage-boosting circuit.

Moreover, the disclosed driving circuit can be applied to microfluidic devices. For example, when a large number of driving electrodes needs to be disposed in a microfluidic device in order to simultaneously perform a large quantities of chemical micro-reaction or substance detection, the driving chip for providing the driving signals may not need to be provided with a lot of signal channels. Therefore, while facilitating the reduction of the computation difficulty of the driving chip, the disclosed driving circuit is also able to provide a sufficiently high driving voltage for the droplet to move normally.

Figure 2:
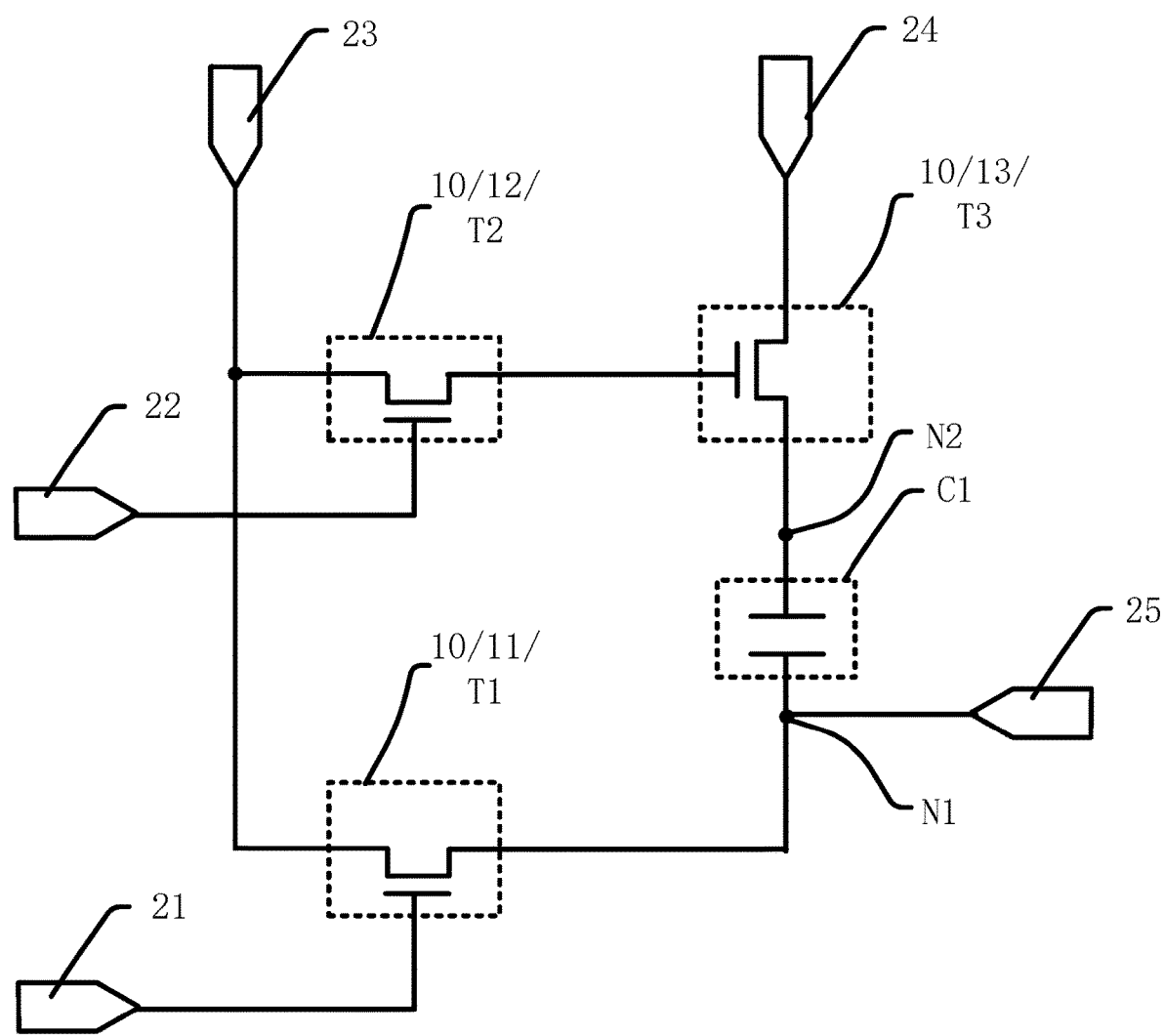
FIG. 2 illustrates a schematic structural view of an exemplary driving circuit consistent with various embodiments of the present disclosure.
Figure 3:
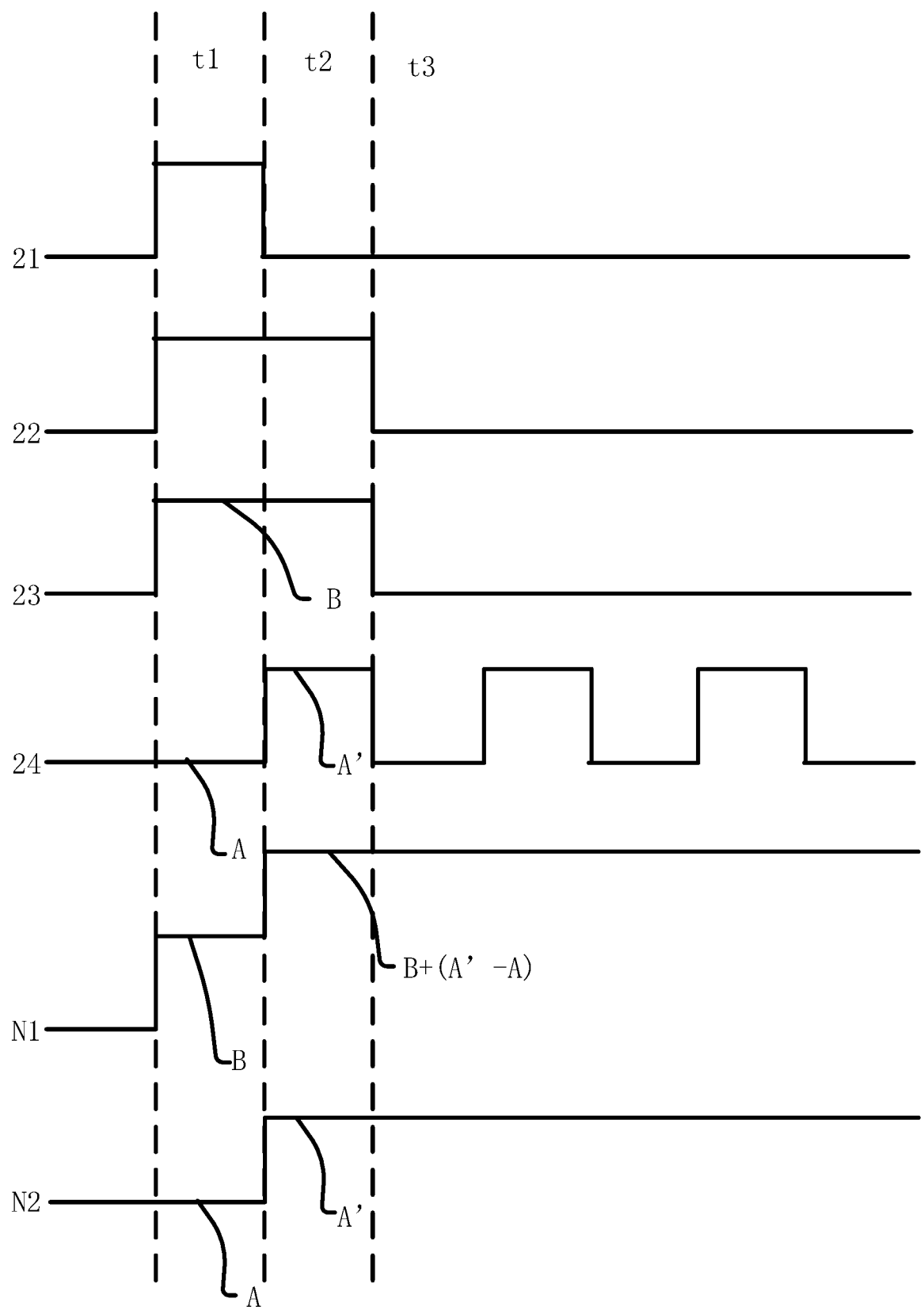
FIG. 3 illustrates a driving sequence diagram for the driving circuit shown in FIG. 2 to provide a high electric-potential signal.

FIG. 2 illustrates a schematic structural view of an exemplary driving circuit consistent with various embodiments of the present disclosure, and FIG. 3 illustrates a driving sequence diagram for the driving circuit shown in FIG. 2 to provide a high electric-potential signal. Referring to FIGS. 2-3, in one embodiment, the first module 11 may include a first transistor T1. A gate electrode of the first transistor T1 may be electrically connected to the first signal-input terminal 21, a first electrode of the first transistor T1 may be electrically connected to the third signal-input terminal 23, and a second electrode of the first transistor T1 may be electrically connected to the first terminal of the first capacitor C1.

Further, the second module 12 may include a second transistor T2. A gate electrode of the second transistor T2 may be electrically connected to the second signal-input terminal 22, and a first electrode of the second transistor T2 may be electrically connected to the third signal-input terminal 23.

Further, the third module 13 may include a third transistor T3. A gate electrode of the third transistor T3 may be electrically connected to a second electrode of the second transistor T2, a first electrode of the third transistor T3 may be electrically connected to the fourth signal-input terminal 24, and a second electrode of the third transistor T3 may be electrically connected to the second terminal of the first capacitor C1.

In one embodiment, the driving circuit may be configured such that the first module 11 may include a first transistor T1, the second module 12 may include a second transistor T2, and the third module 13 may include a third transistor T3. The exemplary structures and the electrical connections of the disclosed driving circuit are described in detail below.

When the disclosed driving circuit operates, during the first time period t1, the first signal-input terminal 21 may send a high electric-potential signal to the gate electrode of the first transistor T1, such that the first transistor T1 may operate in the on state. A high electric-potential signal B (e.g., signal B) at the third signal-input terminal 23 may be transmitted to a first node N1 through the first transistor T1, such that the electric potential at the first node N1 may be B. The second signal-input terminal 22 may send a high electric-potential signal to the gate electrode of the second transistor T2, such that the second transistor T2 may operate in the on state. The high electric-potential signal B at the third signal-input terminal 23 may be transmitted to the gate electrode of the third transistor T3 through the second transistor T2, such that the third transistor T3 may operate in the on state. A low electric-potential signal A at the fourth signal-input terminal 24 may be transmitted to a second node N2 through the third transistor T3. At this time, the voltage difference between the two terminals of the first capacitor C1 is the difference between the electric potential at the first node N1 and the electric potential at the second node N2, e.g., (B-A).

During the second time period t2, the first signal-input terminal 21 may send a low electric-potential signal to the gate electrode of the first transistor T1, such that the first transistor T1 may operate in the off state. Therefore, the transmission of the signal at the third signal-input terminal 23 to the first node N1 through the first transistor T1 may be blocked, and thus the electric potential of the signal at the first node N1 may be locked. The second signal-input terminal 22 may continue to send the high electric-potential signal to the gate electrode of the second transistor T2, such that the second transistor T2 may remain in the on state. The high electric-potential signal at the third signal-input terminal 23 may be transmitted to the gate electrode of the third transistor T3 through the second transistor T2, such that the third transistor T3 may operate in the on state. A high electric-potential signal A' (e.g. signal A') at the fourth signal-input terminal 24 may be transmitted to the second node N2 through the third transistor T3. Because A'>A and the voltage difference between the two terminals of the first capacitor C1 remains unchanged, the electric potential at the first node N1 may be raised to (A'+(B-A))=(B+(A'-A)).

During the third time period t3, the third signal-input terminal 23 may be sent in a low electric-potential signal, and the low electric-potential signal at the third signal-input terminal 23 may be transmitted to the gate electrode of the third transistor T3 through the second transistor T2, such that the third transistor T3 may operate in the off state.

Therefore, the transmission of the signal at the fourth signal-input terminal 24 to the second node N2 through the third transistor T3 may be blocked, and thus the electric potential of the signal at the second node N2 may be locked. The second signal-input terminal 22 may send a low electric-potential signal to the gate electrode of the second transistor T2, such that the second transistor T2 may operate in the off state. Therefore, a low electric-potential signal may be locked on the gate electrode of the third transistor T3. As such, the electric potential at the first terminal of the first capacitor C1 which has been raised to (B+(A'-A)) may be outputted through the signal-output terminal 25.

Therefore, through the three operation steps described above, the disclosed driving circuit is able to realize the function of low voltage input and high voltage output.

It should be noted that, FIG. 3 only exemplarily shows a driving sequence diagram when the first transistor T1, the second transistor T2, and the third transistor T3 are all N-type transistors. For an N-type transistor, a high electric-potential signal may control the transistor to operate in the on state, and a low electric-potential signal may control the transistor to operate in the off state. In some other embodiment, the first transistor and the second transistor may be both P-type transistors. For a P-type transistor, a low electric-potential signal may control the transistor to operate in the on state, and a high electric-potential signal may control the transistor to operate in the off state. Therefore, when the first transistor and the second transistor are both P-type transistors, the corresponding driving sequence may also be changed, which will not be described in detail herein.

Figure 4:
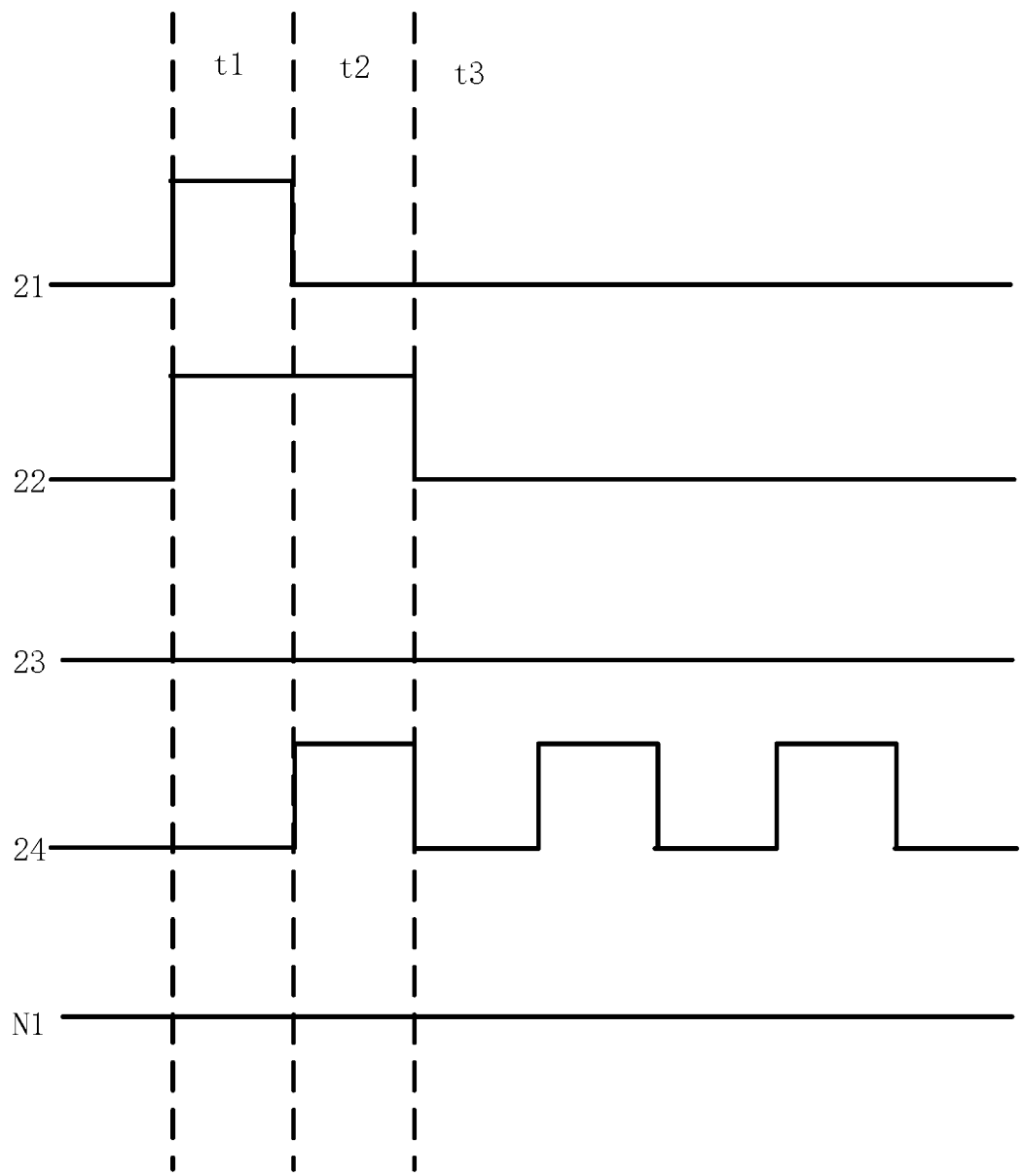
FIG. 4 illustrates a driving sequence diagram for the driving circuit shown in FIG. 2 to provide a low electric-potential signal.

FIG. 4 illustrates a driving sequence diagram for the driving circuit shown in FIG. 2 to provide a low electric-potential signal. Referring to FIGS. 2 and 4, in one embodiment, during the first time period t1 and the second time period t2, when the third signal-input terminal 23 is sent in a low electric-potential signal, the first node N1 (e.g., the first terminal of the first capacitor C1) may always output a low electric-potential signal. According to the description above, by modifying the driving sequence, the disclosed driving circuit may be able to realize the function of low voltage input and high voltage output. In addition, the disclosed driving circuit may also be able to realize the function of low electric-potential input and low electric-potential output, and the only requirement is to change the input signal at the third signal-input terminal 23. The structure of the disclosed driving circuit is simple. When outputting signals with different electric potentials, the structure of the driving circuit may not need to be changed, and only the driving sequence may need to be adjusted. Therefore, the disclosed driving circuit may be conducive to the simplification of the driving operation.

Figure 5:
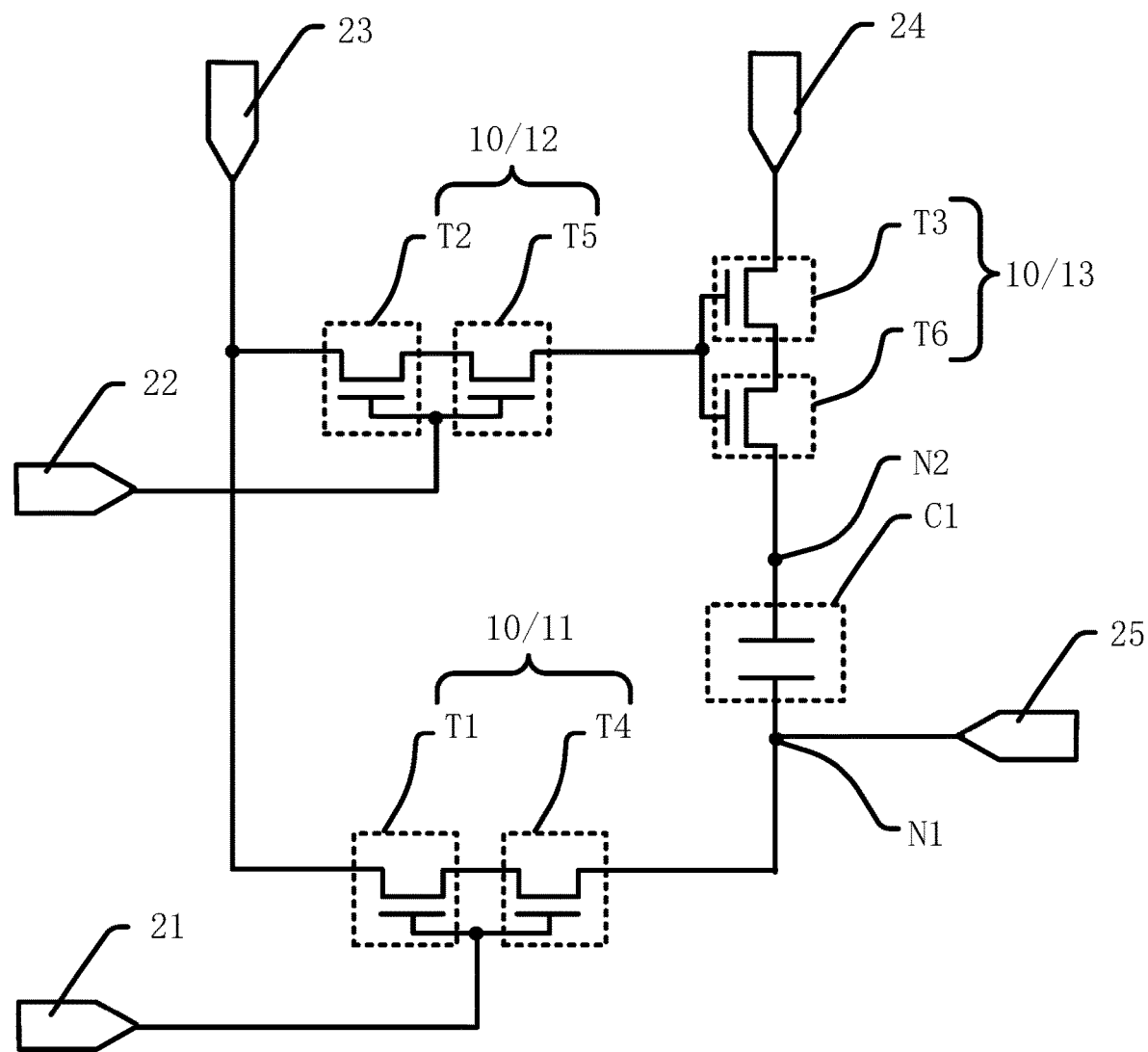
FIG. 5 illustrates a schematic structural view of another exemplary driving circuit consistent with various embodiments of the present disclosure.

FIG. 5 illustrates a schematic structural view of another exemplary driving circuit consistent with various embodiments of the present disclosure. Referring to FIG. 5, in one embodiment, the first module 11 may further include a fourth transistor T4. A gate electrode of the fourth transistor T4 may be electrically connected to the gate electrode of the first transistor T1, a first electrode of the fourth transistor T4 may be electrically connected to the second electrode of the first transistor T1, and a second electrode of the fourth transistor T4 may be electrically connected to the first terminal of the first capacitor C1.

The second module 12 may further include a fifth transistor T5. A gate electrode of the fifth transistor T5 may be electrically connected to the gate electrode of the second transistor T2, a first electrode of the fifth transistor T5 may be electrically connected to the second electrode of the second transistor T2, and a second electrode of the fifth transistor T5 may be electrically connected to the gate electrode of the third transistor T3.

The third module 13 may further include a sixth transistor T6. A gate electrode of the sixth transistor T6 may be electrically connected to the gate electrode of the third transistor T3, a first electrode of the sixth transistor T6 may be electrically connected to the second electrode of the third transistor T3, and a second electrode of the sixth transistor T6 may be electrically connected to the second terminal of the first capacitor C1.

In one embodiment, the disclosed driving circuit may be further configured such that the first module 11 may also include a fourth transistor T4, the second module 12 may also include a fifth transistor T5, and the third module 13 may also include a sixth transistor T6. Further, the fourth transistor T4 may be electrically connected to the first transistor T1, and then electrically connected to the third signal-input terminal 23 through the first transistor T1, the fifth transistor T5 may be electrically connected to the second transistor T2, and then electrically connected to the third signal-input terminal 23 through the second transistor T2, and the sixth transistor T6 may be electrically connected to the third transistor T3, and then electrically connected to the fourth signal-input terminal 24 through the third transistor T3. As such, the fourth transistor T4 and the first transistor T1, the fifth transistor T5 and the second transistor T2, and the sixth transistor T6 and the third transistor T3 may form three double-channel transistor structures, respectively. When the third signal-input terminal 23 of the driving circuit provides an electric-potential signal to the first terminal of the first capacitor C1 through the fourth transistor T4 and the first transistor T1, and the current flowing through the first electrode of the first transistor T1 is I, the leakage current passing through the gate electrode of the first transistor T1 may be (A %×I), where A % is the leakage current ratio. When the leakage current of (A %×I) further passes through the gate electrode of the fourth transistor T4, the leakage current may be (A %×I×A %). For example, the value of A may be 10, and thus the leakage current may be (10%×I) when passing through the gate electrode of the first transistor T1, and the leakage current may be (10%×I× 10%)=1% I when further passing through the gate electrode of the fourth transistor T4. As such, compared to the leakage current in a case that only involves the first transistor T1, the leakage current in the case that involves both the first transistor T1 and the fourth transistor T4 may be reduced by 9% I when transmitting to the first terminal of the first capacitor C1. Similarly, when the third signal-input terminal 23 provides an electric-potential signal to the third module 13 through the fifth transistor T5 and the second transistor T2, the leakage current may also be reduced. Moreover, when the third signal-input terminal 23 provides an electric-potential signal to the second terminal of the first capacitor C1 through the sixth transistor T6 and the third transistor T3, the leakage current may also be reduced.

Therefore, by configuring the driving circuit such that the first module 11 further includes a fourth transistor T4, the second module 12 further includes a fifth transistor T5, and the third module 13 further includes a sixth transistor T6, the leakage current may be reduced, and thus the stability of the output signal at driving circuit may be improved.

Figure 6:
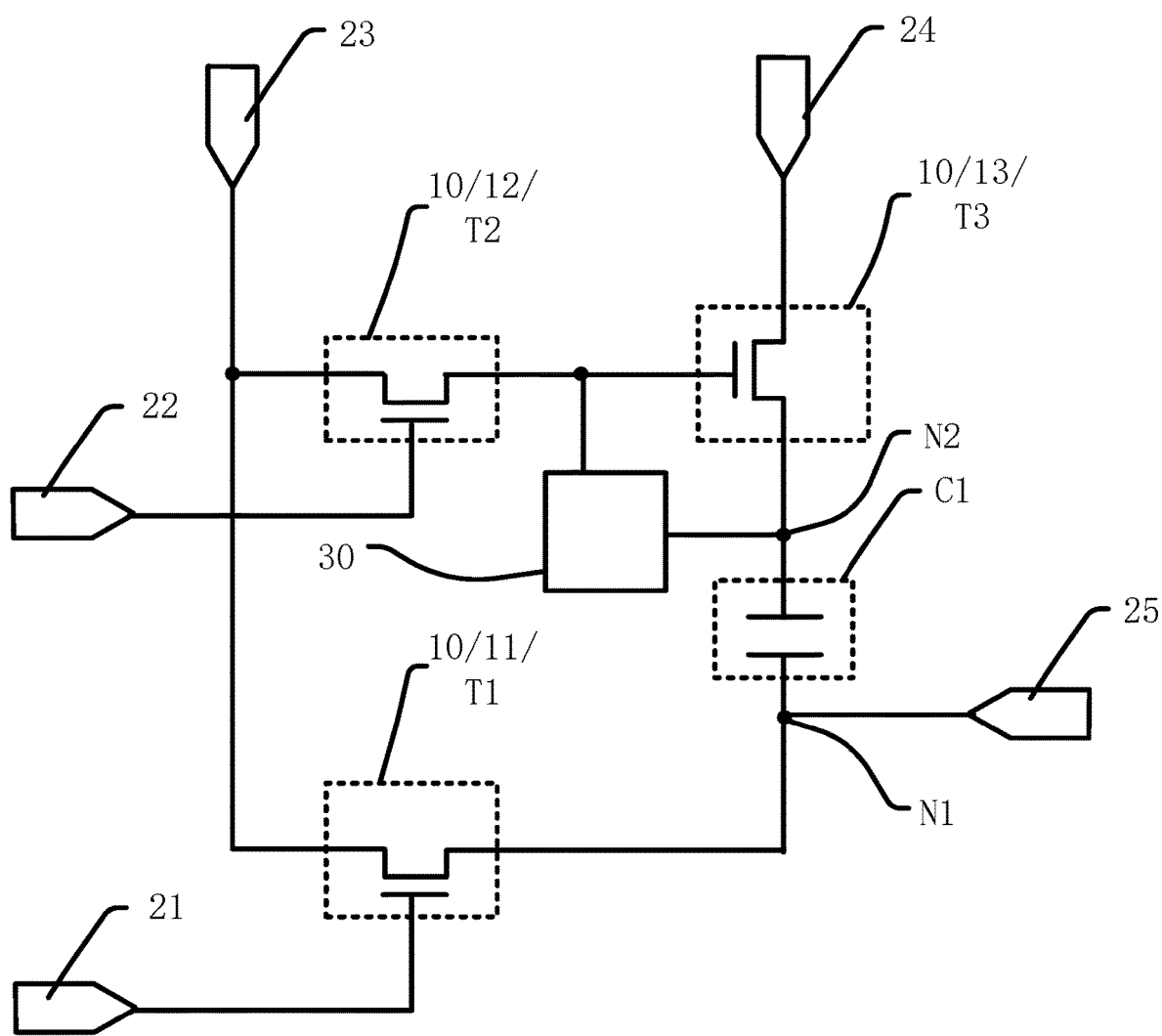
FIG. 6 illustrates a schematic structural view of another exemplary driving circuit consistent with various embodiments of the present disclosure.

FIG. 6 illustrates a schematic structural view of another exemplary driving circuit consistent with various embodiments of the present disclosure. Referring to FIG. 6, in one embodiment, the driving circuit may further include a voltage-stabilizing unit 30. The voltage voltage-stabilizing 30 may be electrically connected to the voltage-boosting unit 10, and may be used to stabilize the signal at the second terminal of the first capacitor C1 to maintain a high electric-potential output at the first terminal of the first capacitor C1.

In one embodiment, the disclosed driving circuit may be configured to further include a voltage-stabilizing unit 30 electrically connected to the voltage-boosting unit 10. The voltage-stabilizing unit 30 may be used to stabilize the signal at the second terminal of the first capacitor C1, such that after the electric-potential signal at the first terminal of the first capacitor C1 is further raised, the first terminal of the first capacitor C1 may be able to maintain the high electric-potential output by stabilizing the signal at the second terminal of the first capacitor C1, thereby increasing the high electric potential retention rate of the driving circuit.

Figure 7:
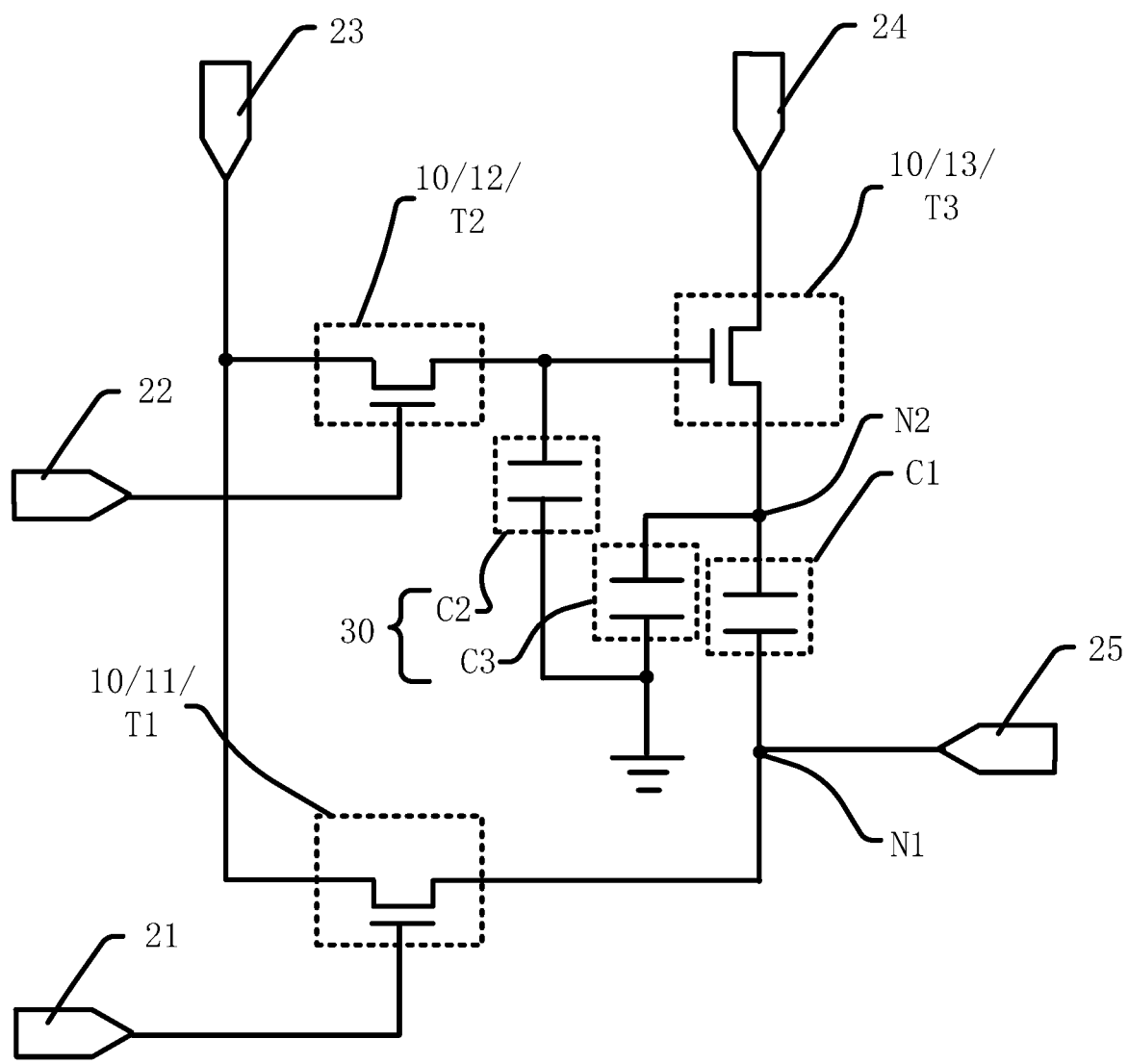
FIG. 7 illustrates a schematic structural view of another exemplary driving circuit consistent with various embodiments of the present disclosure.

FIG. 7 illustrates a schematic structural view of another exemplary driving circuit consistent with various embodiments of the present disclosure. Referring to FIG. 7, in one embodiment, the voltage-stabilizing unit 30 may include a second capacitor C2 and a third capacitor C3.

A first terminal of the second capacitor C2 may be electrically connected to the gate electrode of the third transistor T3, and a second terminal of the second capacitor C2 may be grounded. The second capacitor C2 may be used to stabilize the signal at the gate electrode of the third transistor T3.

A first terminal of the third capacitor C3 may be electrically connected to the first terminal of the first capacitor C1, and a second terminal of the third capacitor C3 may be grounded. The third capacitor C3 may be used to stabilize the signal at the second terminal of the first capacitor C1.

For example, the structure of the voltage-stabilizing unit 30 in the driving circuit may include a second capacitor C2 and a third capacitor C3. A first terminal of the second capacitor C2 may be electrically connected to the gate electrode of the third transistor T3, and a second terminal of the second capacitor C2 may be grounded. Because the two terminals of the second capacitor C2 need to maintain a certain electric-potential difference, the second capacitor C2 can be used to stabilize the signal at the gate electrode of the third transistor T3. A first terminal of the third capacitor C3 may be electrically connected to the first terminal of the first capacitor C1, and a second terminal of the third capacitor C3 may be grounded. Because the two terminals of the third capacitor C3 need to maintain a certain electric-potential difference, the third capacitor C3 can be used to stabilize the signal at the second terminal of the first capacitor C1, such that the first terminal of the first capacitor C1 may be able to maintain the high electric-potential output, thereby increasing the high electric potential retention rate of the driving circuit.

The present disclosure further provides a driving method. FIG. 8 illustrates a schematic diagram of a working flow of an exemplary driving method for a driving circuit consistent with various embodiments of the present disclosure. Referring to FIGS. 1 and 8, the driving method may be applied to a driving circuit consistent with various embodiments of the present disclosure. In one embodiment, the driving method may include the following exemplary steps.

In step 101, during a first time period t1, the signal B (e.g., an electric potential of the signal is B) at the third signal-input terminal 23 may be transmitted to the first terminal of the first capacitor C1 through the first module 11, the signal at the third signal-input terminal 23 may be transmitted to the third module 13 through the second module 12, and the signal A (e.g., an electric potential of the signal is A) at the fourth signal-input terminal 24 may be transmitted to the second terminal of the first capacitor C1, such that an electric-potential difference (B-A) may be formed between the two terminals of the first capacitor C1.

In step 102, during a second time period t2, the transmission of the signal at the third signal-input terminal 23 to the first terminal of the first capacitor C1 through the first module may be blocked, such that the electric potential of the signal at the first terminal of the first capacitor C1 may be locked. The signal at the third signal-input terminal 23 may be transmitted to the third module 13 through the second module 12, and the signal A' (e.g., an electric potential of the signal is A') at the fourth signal-input terminal 24 may be transmitted to the second terminal of the first capacitor C1 through the third module 13, such that the signal at the first terminal of the first capacitor C1 may be raised to (B+(A'-A)).

In step 103, during a third time period t3, the transmission of the signal at the third signal-input terminal 23 to the third module 13 through the second module 12 may be blocked, and the transmission of the signal at the fourth signal-input terminal 24 to the second terminal of the first capacitor C1 through the third module 13 may be blocked, such that the electric potential of the signal at the second terminal of the first capacitor C1 may be locked. Therefore, the electric potential of the signal at the first terminal of the first capacitor C1 may remain at (B+(A'-A)), and may be outputted through the signal-output terminal 25.

It should be noted that the electric potentials of A, B, A' satisfy 0<A<B, and 0<A<A'.

In the following, the driving method for a driving circuit consistent with various embodiments of the present disclosure will be described in detail. In one embodiment, the driving method may at least include the following three steps.

In step 101, during a first time period t1, the driving method may control the first module 11 to operate in the on state by inputting a signal through the first signal-input terminal 21, transmit the signal B at the third signal-input terminal 23 to the first terminal of the first capacitor C1 through the first module 11, control the second module 12 to operate in the on state by inputting a signal through the second signal-input terminal 22, transmit the signal at the third signal-input terminal 23 to the third module 13 through the second module 12, and control the third module 13 to operate in the on state by inputting a signal through the third signal-input terminal 23. As such, the signal A at the fourth signal-input terminal 24 may be transmitted to the second terminal of the first capacitor C1 through the third module 13. Because 0<A<B, a voltage difference (B-A) may be generated between the first terminal and the second terminal of the first capacitor C1.

In step 102, during a second time period t2, the disclosed driving method may control the first module 11 to operate in the off state by inputting a signal through the first signal-input terminal 21, block the transmission of the signal at the third signal-input terminal 23 to the first terminal of the first capacitor C1 through the first module 11, such that the electric potential of the signal at the first terminal of the first capacitor C1 may be locked, transmit the signal A' at the fourth signal-input terminal 24 to the second terminal of the first capacitor C1 through the third module 13. Because 0<A<A', and the voltage difference between the two terminals of the first capacitor C1 remains unchanged, the electric potential of the signal at the first terminal of the first capacitor C1 may be further improved to (B+(A'-A)).

In step 103, during a third time period, the disclosed driving method may transmit the signal at the third signal-input terminal 23 to the third module 13 through the second module 12, control the third module 13 to operate in the off state by inputting a signal through the third signal-input terminal 23, and block the transmission of the signal at the fourth signal-input terminal 24 to the second terminal of the first capacitor C1 through the third module 13, so that the electric potential of the signal at the second terminal of the first capacitor C1 may be locked at A'. Therefore, the electric potential of the signal at the first terminal of the first capacitor may remain at (B+(A'-A)), and the signal-output terminal 25 that is electrically connected to the first terminal of the first capacitor C1 may output a high electric-potential signal, e.g. (B+(A'-A)). As such, the function of low voltage input and high voltage output may be achieved in the driving circuit, which is conducive to realizing the voltage-boosting circuit.

Further, referring to FIGS. 2, 3, and 8, in one embodiment, the first module 11 may include a first transistor T1. A gate electrode of the first transistor T1 may be electrically connected to the first signal-input terminal 21, a first electrode of the first transistor T1 may be electrically connected to the third signal-input terminal 23, and a second electrode of the first transistor T1 may be electrically connected to the first terminal of the first capacitor C1.

Further, the second module 12 may include a second transistor T2. A gate electrode of the second transistor T2 may be electrically connected to the second signal-input terminal 22, and a first electrode of the second transistor T2 may be electrically connected to the third signal-input terminal 23.

Further, the third module 13 may include a third transistor T3. A gate electrode of the third transistor T3 may be electrically connected to a second electrode of the second transistor T2, a first electrode of the third transistor T3 may be electrically connected to the fourth signal-input terminal 24, and a second electrode of the third transistor T3 may be electrically connected to the second terminal of the first capacitor C1.

During a first time period t1, the first transistor T1 may operate in the on state, such that the signal at the third signal-input terminal 23 may be transmitted to the first terminal of the first capacitor C1, the second transistor T2 may operate in the on state, such that the signal at the third signal-input terminal 23 may be transmitted to the third transistor T3, and the third transistor T3 may operate in the on state, such that the signal at the fourth signal-input terminal 24 may be transmitted to the second terminal of the first capacitor C1.

During a second time period t2, the first transistor T1 may operate in the off state, such that the transmission of the signal at the third signal-input terminal 23 to the first terminal of the first capacitor C1 may be blocked, and the electric potential of the signal at the first terminal of the first capacitor C1 may thus be locked. Moreover, the second transistor T2 may operate in the on state, such that the signal at the third signal-input terminal 23 may be transmitted to the third transistor T3, and the third transistor T3 may operate in the on state, such that the signal at the fourth signal-input terminal 24 may be transmitted to the second terminal of the first capacitor C1. As such, the electric potential of the signal at the first terminal of the first capacitor C1 may be raised.

During a third time period t3, the second transistor T2 may operate in the off state, such that the transmission of the signal at the third signal-input terminal 23 to the third transistor T3 may be blocked, the third transistor T3 may operate in the off state, such that the transmission of the signal at the fourth signal-input terminal 24 to the second terminal of the first capacitor C1 may be blocked, and the electric potential of the signal at the second terminal of the first capacitor C1 may thus be locked. The signal at the first terminal of the first capacitor C1 may remain at a high electric potential, and may be outputted through the signal-output terminal 25.

When the disclosed driving circuit operates, step 101 may include the following operations. During the first time period t1, the first signal-input terminal 21 may send a high electric-potential signal to the gate electrode of the first transistor T1, such that the first transistor T1 may operate in the on state. A high electric-potential signal B (e.g., signal B) at the third signal-input terminal 23 may be transmitted to a first node N1 through the first transistor T1, such that the electric potential at the first node N1 may be B. The second signal-input terminal 22 may send a high electric-potential signal to the gate electrode of the second transistor T2, such that the second transistor T2 may operate in the on state. The high electric-potential signal B at the third signal-input terminal 23 may be transmitted to the gate electrode of the third transistor T3 through the second transistor T2, such that the third transistor T3 may operate in the on state. A low electric-potential signal A at the fourth signal-input terminal 24 may be transmitted to a second node N2 through the third transistor T3. At this time, the voltage difference between the two terminals of the first capacitor C1 is the difference between the electric potential at the first node N1 and the electric potential at the second node N2, e.g., (B-A).

Step 102 may include the following operations. During the second time period t2, the first signal-input terminal 21 may send a low electric-potential signal to the gate electrode of the first transistor T1, such that the first transistor T1 may operate in the off state. Therefore, the transmission of the signal at the third signal-input terminal 23 to the first node N1 through the first transistor T1 may be blocked, and thus the electric potential of the signal at the first node N1 may be locked. The second signal-input terminal 22 may continue to send the high electric-potential signal to the gate electrode of the second transistor T2, such that the second transistor T2 may remain in the on state. The high electric-potential signal at the third signal-input terminal 23 may be transmitted to the gate electrode of the third transistor T3 through the second transistor T2, such that the third transistor T3 may operate in the on state. A high electric-potential signal A' (e.g. signal A') at the fourth signal-input terminal 24 may be transmitted to the second node N2 through the third transistor T3. Because A'>A and the voltage difference between the two terminals of the first capacitor C1 remains unchanged, the electric potential at the first node N1 may be raised to (A'+(B-A))=(B+(A'-A)).

Step 103 may include the following operations. During the third time period t3, the third signal-input terminal 23 may be sent in a low electric-potential signal, and the low electric-potential signal at the third signal-input terminal 23 may be transmitted to the gate electrode of the third transistor T3 through the second transistor T2, such that the third transistor T3 may operate in the off state. Therefore, the transmission of the signal at the fourth signal-input terminal 24 to the second node N2 through the third transistor T3 may be blocked, and thus the electric potential of the signal at the second node N2 may be locked. The second signal-input terminal 22 may send a low electric-potential signal to the gate electrode of the second transistor T2, such that the second transistor T2 may operate in the off state. Therefore, a low electric-potential signal may be locked on the gate electrode of the third transistor T3. As such, the electric potential at the first terminal of the first capacitor C1 which has been raised to (B+(A'-A)) may be outputted through the signal-output terminal 25.

Figure 9:
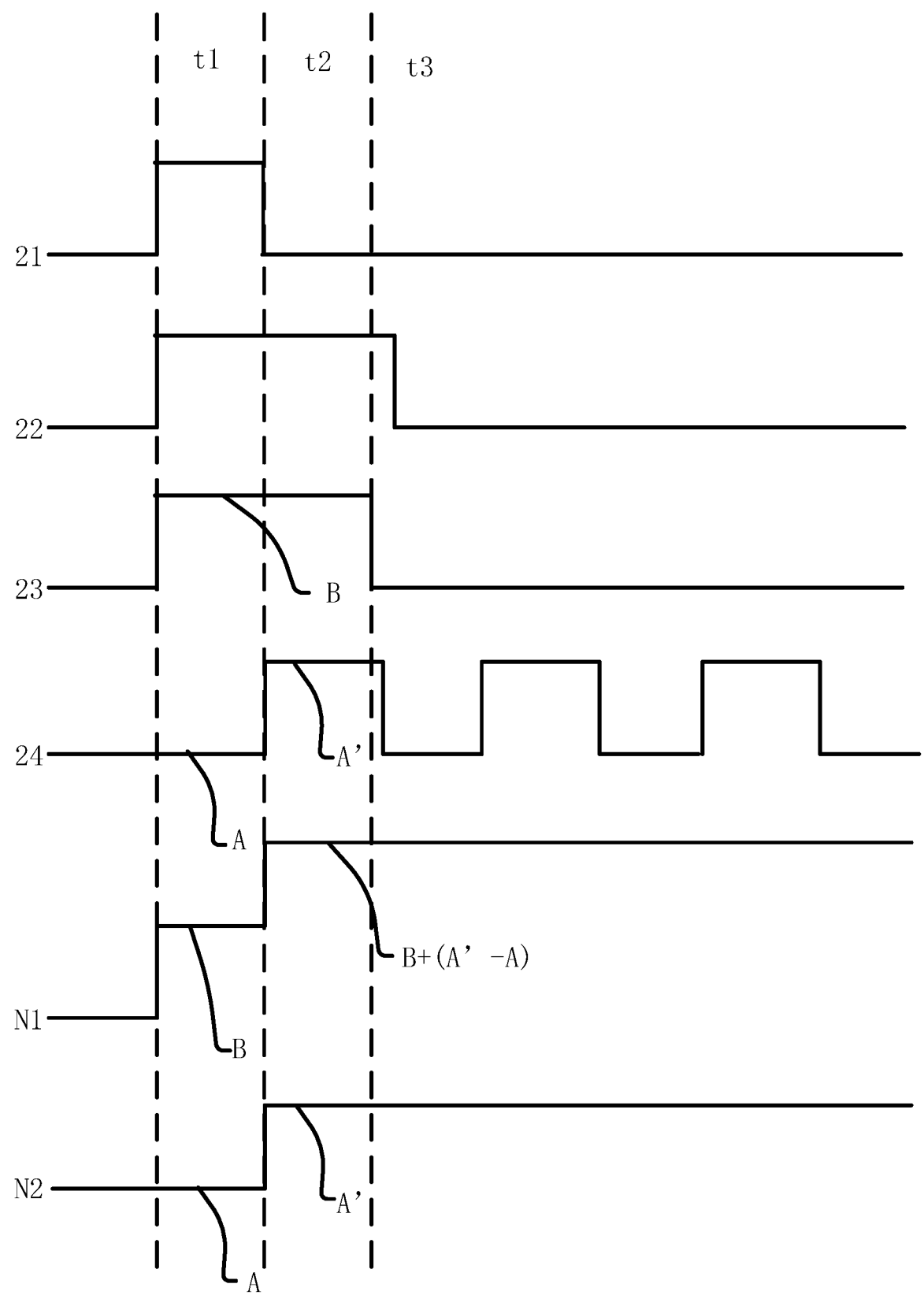
FIG. 9 illustrates another driving sequence diagram for the driving circuit shown in FIG. 2 to provide a high electric-potential signal.

FIG. 9 illustrates another driving sequence diagram for the driving circuit shown in FIG. 2 to provide a high electric-potential signal. Referring to FIGS. 2, 8 and 9, in one embodiment, during the third time period t3, the third transistor T3 may operate in the off state first, and then the electric potential of the signal at the fourth signal-input terminal 24 may be reduced to A before turning the second transistor T2 to the off state.

For example, step 103 may include the following operations. During the third time period t3, the third signal-input terminal 23 may be sent in a low electric-potential signal, and the low electric-potential signal at the third signal-input terminal 23 may be transmitted to the gate electrode of the third transistor T3 through the second transistor T2, such that the third transistor T3 may operate in the off state. Therefore, the transmission of the signal at the fourth signal-input terminal 24 to the second node N2 through the third transistor T3 may be blocked, and thus the electric potential of the signal at the second node N2 may be locked. Further, the electric potential of the signal at the fourth signal-input terminal 24 may be reduced to A, preparing for sending the signal A to the second terminal of the first capacitor C1 in the next driving circuit. Then, a low electric-potential signal may be sent to the gate electrode of the second transistor T2 through the second signal-input terminal 22, such that the second transistor T2 may operate in the off state. Therefore, the signal at the gate electrode of the third transistor T3 may be locked at a low electric potential. As such, the electric potential at the first terminal of the first capacitor C1 which has been raised to (B+(A'-A)) may be outputted through the signal-output terminal 25. The method of sending a low electric-potential signal to the third signal-input terminal 23 to turn the third transistor T3 first to the off state, and then sending a low electric-potential signal to the second signal-input terminal 22 to turn the second transistor T2 to the off state may be able to effectively ensure that the gate electrode of the third transistor T3 remains at a low electric potential, improving the turn-off capability of the third transistor T3 during the third time period t3. Therefore, pulling down the electric potential of the signal at the second node N2 by the signal A at the fourth signal-input terminal 24 due to poor turn-off capability of the third transistor T3 may be effectively prevented.

Further, referring to FIG. 6, in one embodiment, the driving circuit may further include a voltage-stabilizing unit 30. The voltage voltage-stabilizing 30 may be electrically connected to the voltage-boosting unit 10, and may be used to stabilize the signal at the second terminal of the first capacitor C1 to maintain a high electric-potential output at the first terminal of the first capacitor C1.

In one embodiment, the disclosed driving circuit may be configured to further include a voltage-stabilizing unit 30 electrically connected to the voltage-boosting unit 10. The voltage-stabilizing unit 30 may be used to stabilize the signal at the second terminal of the first capacitor C1, such that after the electric-potential signal at the first terminal of the first capacitor C1 is further raised, the first terminal of the first capacitor C1 may be able to maintain the high electric-potential output by stabilizing the signal at the second terminal of the first capacitor C1, thereby increasing the high electric potential retention rate of the driving circuit.

FIG. 10 illustrates a schematic diagram of another working flow of an exemplary driving method for a driving circuit consistent with various embodiments of the present disclosure. Referring to FIGS. 7 and 10, the voltage-stabilizing unit 30 may include a second capacitor C2 and a third capacitor C3. A first terminal of the second capacitor C2 may be electrically connected to the gate electrode of the third transistor T3, and a second terminal of the second capacitor C2 may be grounded. The second capacitor C2 may be used to stabilize the signal at the gate electrode of the third transistor T3. A first terminal of the third capacitor C3 may be electrically connected to the first terminal of the first capacitor C1, and a second terminal of the third capacitor C3 may be grounded.

The driving method may further include a fourth step 104 corresponding to a voltage-stabilizing time period t4 between the second time period t2 and the third time period t3.

In step 104, during the voltage-stabilizing time period t4, the voltage-stabilizing unit 30 may be able to stabilize the signal at the second terminal of the first capacitor C1, such that the first terminal of the first capacitor C1 may maintain the high electric-potential output.

For example, the structure of the voltage-stabilizing unit 30 in the driving circuit may include a second capacitor C2 and a third capacitor C3. A first terminal of the second capacitor C2 may be electrically connected to the gate electrode of the third transistor T3, and a second terminal of the second capacitor C2 may be grounded. Because the two terminals of the second capacitor C2 need to maintain a certain electric-potential difference, the second capacitor C2 can be used to stabilize the signal at the gate electrode of the third transistor T3 during the voltage-stabilizing time period t4. A first terminal of the third capacitor C3 may be electrically connected to the first terminal of the first capacitor C1, and a second terminal of the third capacitor C3 may be grounded. Because the two terminals of the third capacitor C3 need to maintain a certain electric-potential difference, the third capacitor C3 can be used to stabilize the signal at the second terminal of the first capacitor C1 during the voltage-stabilizing time period t4, such that the first terminal of the first capacitor C1 may be able to maintain the high electric-potential output, thereby increasing the high electric potential retention rate of the driving circuit.

Figure 11:
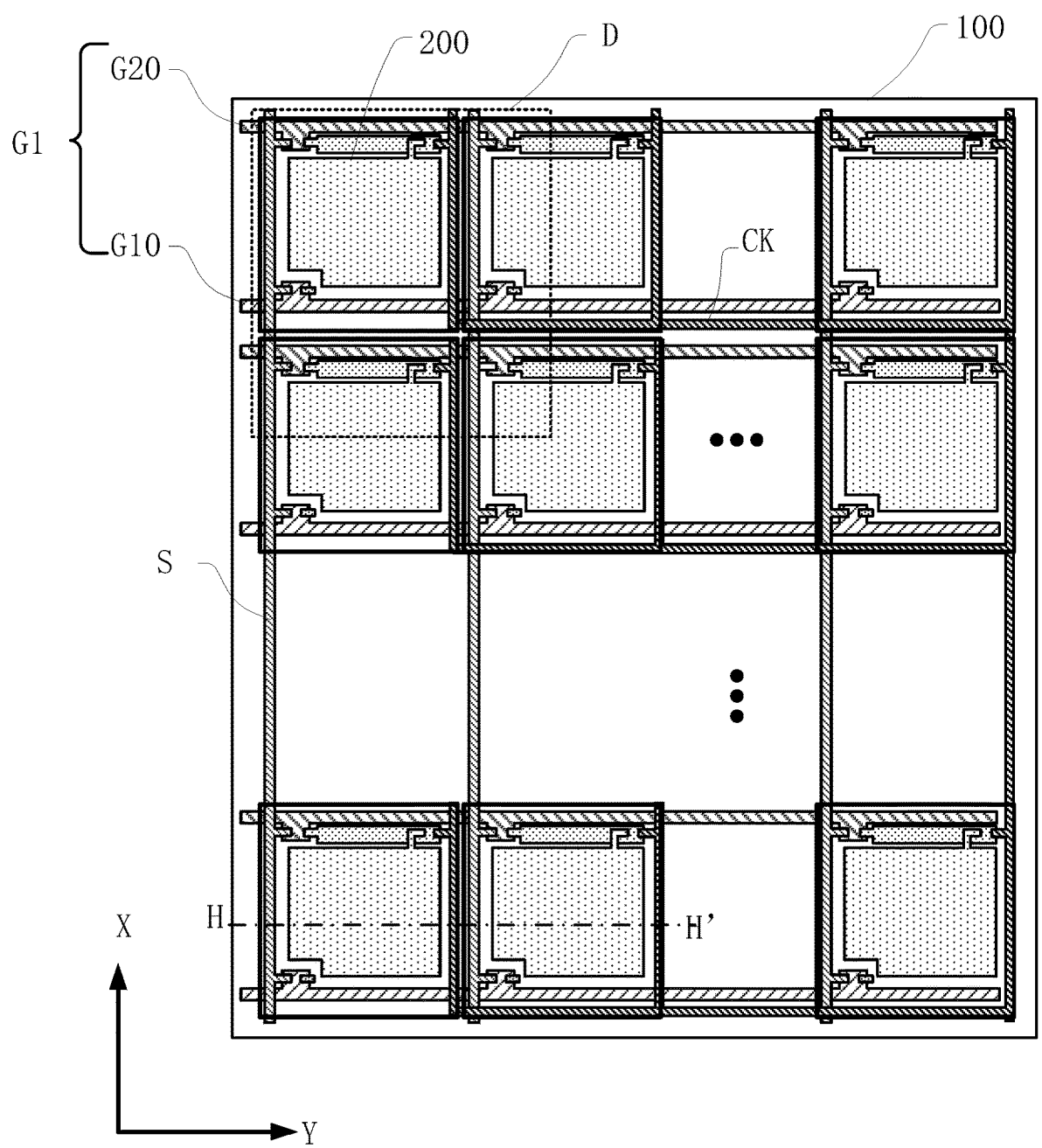
FIG. 11 illustrates a schematic plan view of an exemplary electrowetting panel consistent with various embodiments of the present disclosure.
Figure 12:
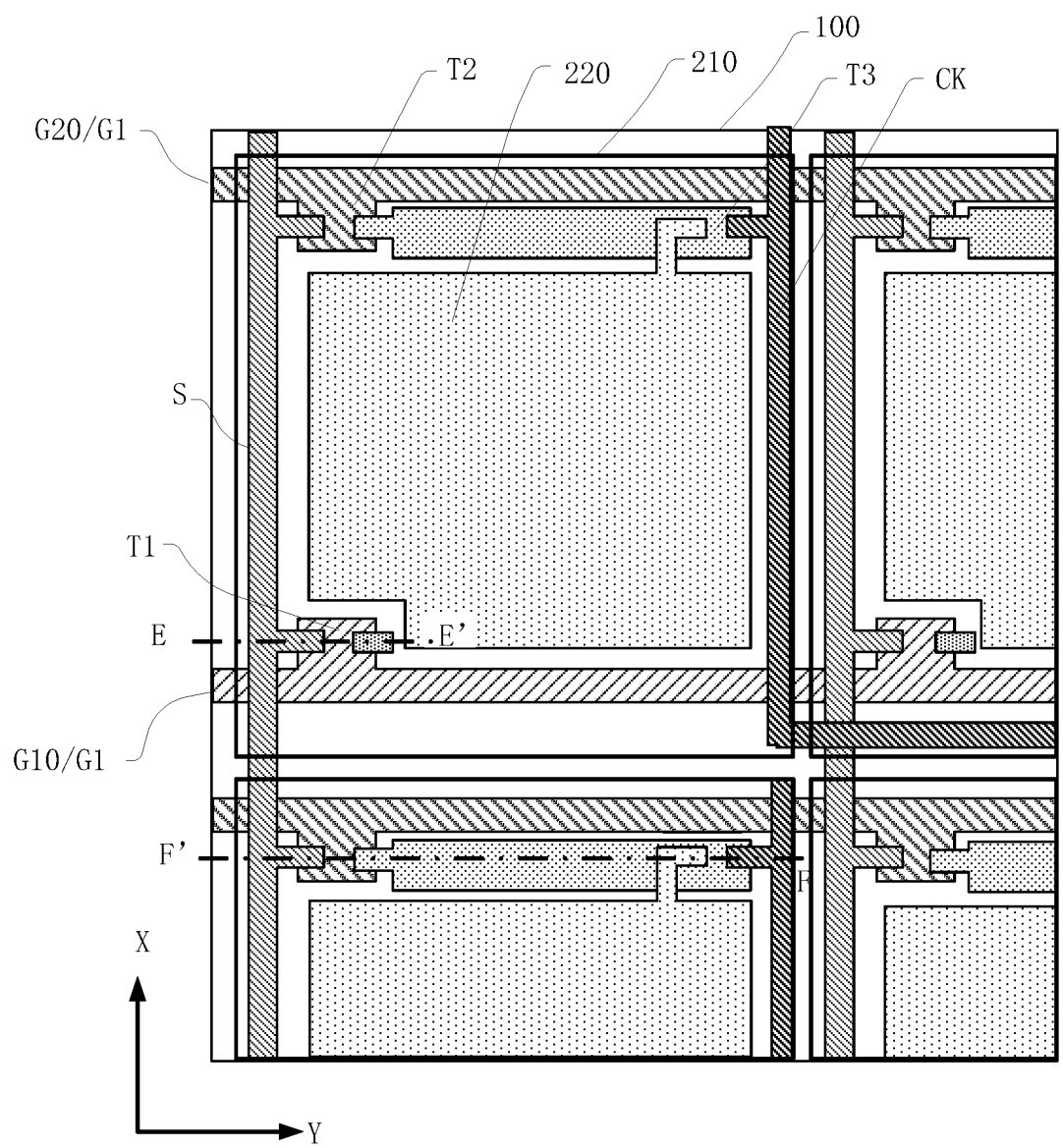
FIG. 12 illustrates a schematic cross-sectional view of a D portion of the electrowetting panel shown in FIG. 11.
Figure 13:
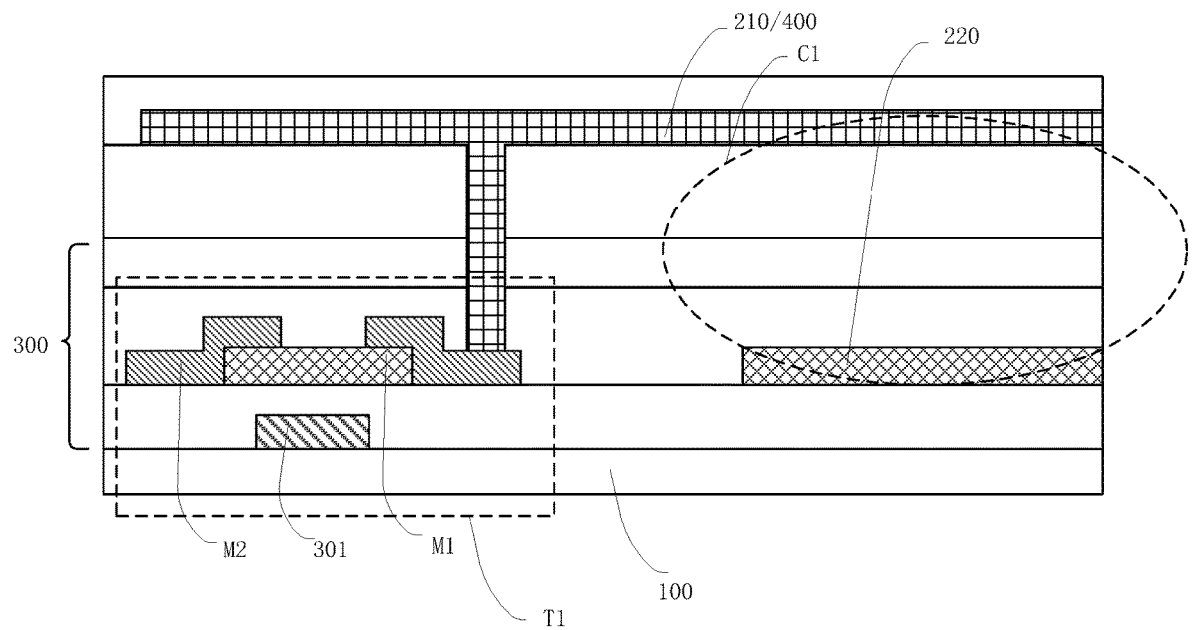
FIG. 13 illustrates a schematic cross-sectional view of the electrowetting panel shown in FIG. 12 along an E-E' direction.
Figure 14:
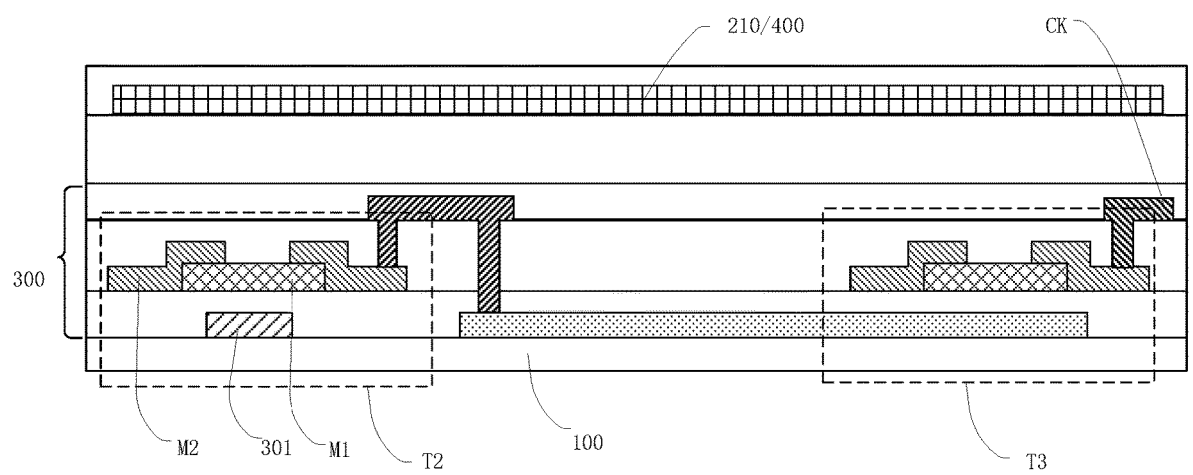
FIG. 14 illustrates a schematic cross-sectional view of the electrowetting panel shown in FIG. 12 along an F-F' direction.

The present disclosure further provides an electrowetting panel. FIG. 11 illustrates a schematic plan view of an exemplary electrowetting panel consistent with various embodiments of the present disclosure, and FIG. 12 illustrates a schematic cross-sectional view of a D portion of the electrowetting panel shown in FIG. 11. FIG. 13 illustrates a schematic cross-sectional view of the electrowetting panel shown in FIG. 12 along an E-E' direction, and FIG. 14 illustrates a schematic cross-sectional view of the electrowetting panel shown in FIG. 12 along an F-F' direction.

Referring to FIGS. 11-14, in one embodiment, the electrowetting panel may include a base substrate 100, a plurality of driving units 200 arranged into an array and located on one side of the base substrate 100, a plurality of scanning-line groups G1, a plurality of data lines S extending along a first direction X, and a common signal line CK.

Each scanning-line group G1 may include a first scanning line G10 and a second scanning line G20. The first scanning line G10 and the second scanning line G20 may both extend along a second direction Y. The first direction X may intersect the second direction Y.

Each driving unit 200 may include a first transistor T1, a second transistor T2, a third transistor T3, a driving electrode 210, and a first electrode 220. The driving electrode 210 and the first electrode 220 may together form a first capacitor C1. That is, the two terminals of the first capacitor C1 may be the driving electrode 210 and the first electrode 220, respectively.

The gate electrode of the first transistor T1 may be electrically connected to the first scanning line G10, the source electrode of the first transistor T1 may be electrically connected to a data line S, and the drain electrode of the first transistor T1 may be electrically connected to the driving electrode 210.

The gate electrode of the second transistor T2 may be electrically connected to the second scanning line G20, the source electrode of the second transistor T2 may be electrically connected to the data line S, and the drain electrode of the second transistor T2 may be electrically connected to the gate electrode of the third transistor T3.

The source electrode of the third transistor T3 may be electrically connected to the common signal line CK, the drain electrode of the third transistor T3 may be electrically connected to the first electrode 220.

For example, in one embodiment, the electrowetting panel may include a plurality of driving units 200 arranged into an array and located on one side of a base substrate 100. Each driving unit 200 may include a first transistor T1, a second transistor T2, a third transistor T3, a driving electrode 210, and a first electrode 220. The driving electrode 210 and the first electrode 220 may together form a first capacitor C1. The gate electrode of the first transistor T1 may be electrically connected to the first scanning line G10, and thus the first transistor T1 may be controlled to operate in the on state or in the off state by a scan signal provided through the first scanning line G10. The gate electrode of the second transistor T2 may be electrically connected to the second scanning line G20, and thus the second transistor T2 may be controlled to operate in the on state or in the off state by a scan signal provided through the second scanning line G20. The source electrode of the second transistor T2 may be electrically connected to a data line S, and the drain electrode of the second transistor T2 may be electrically connected to the gate electrode of the third transistor T3, such that the third transistor T3 may be controlled to operate in the on state or in the off state by the data signal of the data line passing through the second transistor T2. The source electrode of the first transistor T1 may be electrically connected to the data line S, and the drain electrode of the first transistor T1 may be electrically connected to the driving electrode 210, such that when the first transistor T1 operates in the on state, the data signal of the data line S may be transmitted to the driving electrode 210. The source electrode of the third transistor T3 may be electrically connected to the common data line CK, and the drain electrode of the third transistor T3 may be electrically connected to the first electrode 220, such that when the third transistor T3 operates in the on state, the common signal of the common signal line CK may be transmitted to the first electrode 220.

In one embodiment, the first transistor T1, the second transistor T2, and the third transistor T3 may all N-type transistors. When the disclosed electrowetting panel operates, first, the first scanning line G10 may send a high electric-potential signal to the gate electrode of the first transistor T1, such that the first transistor T1 may operate in the on state. A high electric-potential signal B (e.g., signal B) of the data line S may be transmitted to the driving electrode 210 through the first transistor T1, such that the electric potential at the driving electrode 210 may be B. The second scanning line G20 may send a high electric-potential signal to the gate electrode of the second transistor T2, such that the second transistor T2 may operate in the on state. The high electric-potential signal of the data line S may be transmitted to the gate electrode of the third transistor T3 through the second transistor T2, such that the third transistor T3 may operate in the on state. A low electric-potential signal A of the common signal line CK may be transmitted to the first electrode 220 through the third transistor T3. At this time, the voltage difference between the driving electrode 210 and the first electrode 220 may be (B-A).

Further, the first scanning line G10 may send a low electric-potential signal to the gate electrode of the first transistor T1, such that the first transistor T1 may operate in the off state. Therefore, the transmission of the signal of the data line S to the driving electrode 210 through the first transistor T1 may be blocked, and thus the electric potential of the signal at the driving electrode 210 may be locked. The second scanning line G20 may continue to send the high electric-potential signal to the gate electrode of the second transistor T2, such that the second transistor T2 may remain in the on state. The high electric-potential signal of the data line S may be transmitted to the gate electrode of the third transistor T3 through the second transistor T2, such that the third transistor T3 may operate in the on state. A high electric-potential signal A' (e.g. signal A') may be sent to the common signal line CK and the high electric-potential signal A' may be transmitted to the first electrode 220 through the third transistor T3. Because A'>A and the voltage difference between the driving electrode 210 and the first electrode 220 remains unchanged, the electric potential at the driving electrode 210 may be raised to (B+(A'-A)).

Further, the data line S may be sent in a low electric-potential signal, and the low electric-potential signal at the data line S may be transmitted to the gate electrode of the third transistor T3 through the second transistor T2, such that the third transistor T3 may operate in the off state. Therefore, the transmission of the signal of the common signal line CK to the first electrode 220 through the third transistor T3 may be blocked, and thus the electric potential of the signal at first electrode 220 may be locked. The second scanning line G20 may send a low electric-potential signal to the gate electrode of the second transistor T2, such that the second transistor T2 may operate in the off state. Therefore, a low electric-potential signal may be locked on the gate electrode of the third transistor T3. As such, the electric potential at the driving electrode 210 may remain at (B+(A'-A)). As such, the function of low electric-potential input and high electric-potential output may be realized in the electrowetting panel, and the driving ability of the electrowetting panel may be improved.

In one embodiment, along the first direction X, the first scanning line G10 and the second scanning line G20 of the scanning-line group G1 may be respectively located on the two sides of the driving electrode 210. The driving electrode 210 may be made of indium tin oxide (ITO), and the first electrode 220 may be made of a metal.

Figure 15:
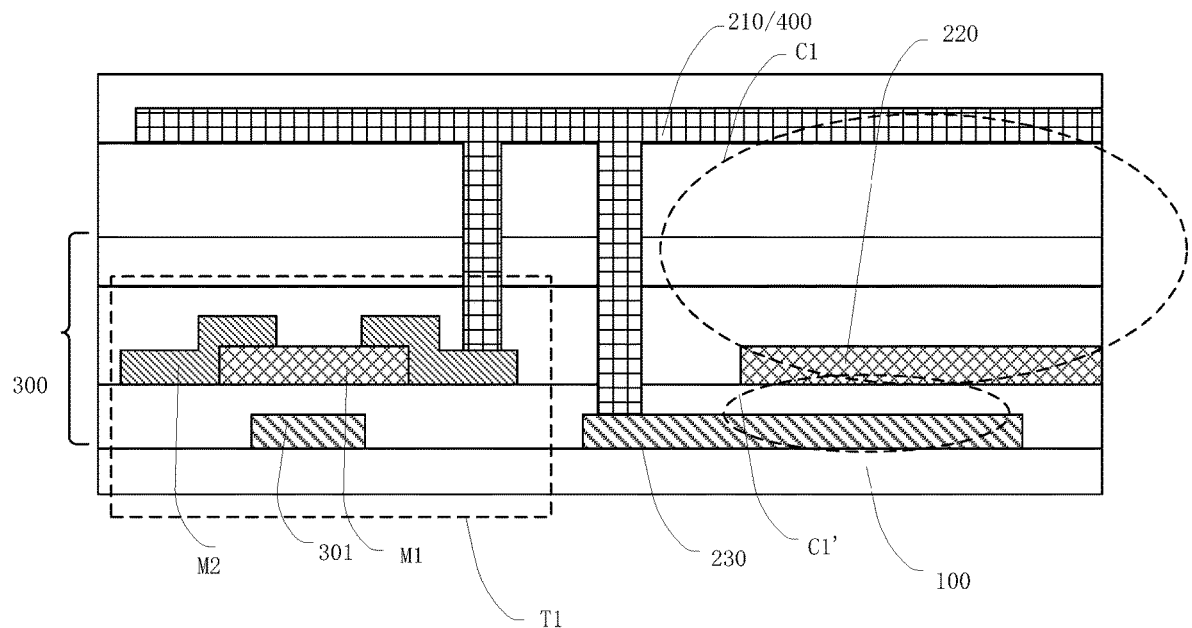
FIG. 15 illustrates another schematic cross-sectional view of the electrowetting panel shown in FIG. 12 along an E-E' direction.

FIG. 15 illustrates another schematic cross-sectional view of the electrowetting panel shown in FIG. 12 along an E-E' direction. Referring to FIGS. 11, 12, and 15, in one embodiment, each driving unit 200 may further include a second electrode 230. The first electrode 220 may be located between the driving electrode 210 and the second electrode 230, and the second electrode 230 may be electrically connected to the driving electrode 210. Therefore, a portion C1' of the first capacitor C1 may be formed between the first electrode 220 and the second electrode 230. That is, with the second electrode 230, the first capacitor C1 may include two parallel portions: a portion formed between the first electrode 220 and the driving electrode 210, and another portion C1' formed between the first electrode 220 and the second electrode 230.

For example, each driving unit 200 may include a second electrode 230. The first electrode 220 may be located between the second electrode 230 and the driving electrode 210, and the second electrode 230 may electrically connected to the driving electrode 210. That is, the second electrode 230 and the driving electrode 210 may have a same electric-potential signal. As such, a portion C1' of the first capacitor C1 may be formed between the first electrode 220 and the second electrode 230. The introduction of the portion C1' of the first capacitor C1 by incorporating the second electrode into the driving unit may be conducive to further raising the electric potential of the driving electrode 210, and thus improve the driving ability of the electrowetting panel.

Further, referring to FIGS. 11, 12, and 15, in one embodiment, the electrowetting panel may also include an array layer 300 and a driving electrode layer 400 disposed on one side of the base substrate 100. The driving electrode layer 400 may be located on the side of the array layer 300 away from the base substrate 100. The array layer 300 may include an active layer 301, a gate metal layer M1, and a source/drain metal layer M2. The driving electrode 210 may be located in the driving electrode layer 400.

The gate electrode of the first transistor T1, the gate electrode of the second transistor T2, and the gate electrode of the third transistor T3 may be located in the gate metal layer M1. The source electrode and the drain electrode of the first transistor T1, the source electrode and the drain electrode of the second transistor T2, and the source electrode and the drain electrode of the third transistor T3 may be located in the source/drain metal layer M2.

The first electrode 220 may be located in the source/drain metal layer M2, and the second electrode 230 may be located in the gate metal layer M1.

It should be noted that, FIGS. 13-15 merely illustrate schematic diagrams of the film-layer structure of the electrowetting panel consistent with various embodiments of the present disclosure. However, the disclosed electrowetting panel may not be limited to the film-layer structure shown in the figures, and the disclosed electrowetting panel may also include other film layers, such as an insulating layer, a planarization layer, etc. Those skilled in the art should understand the panel structure of the present disclosure based on the film-layer structure of existing electrowetting panels. In one embodiment, the driving electrode 400 may be made of a transparent conductive material, such as ITO.

Figure 16:
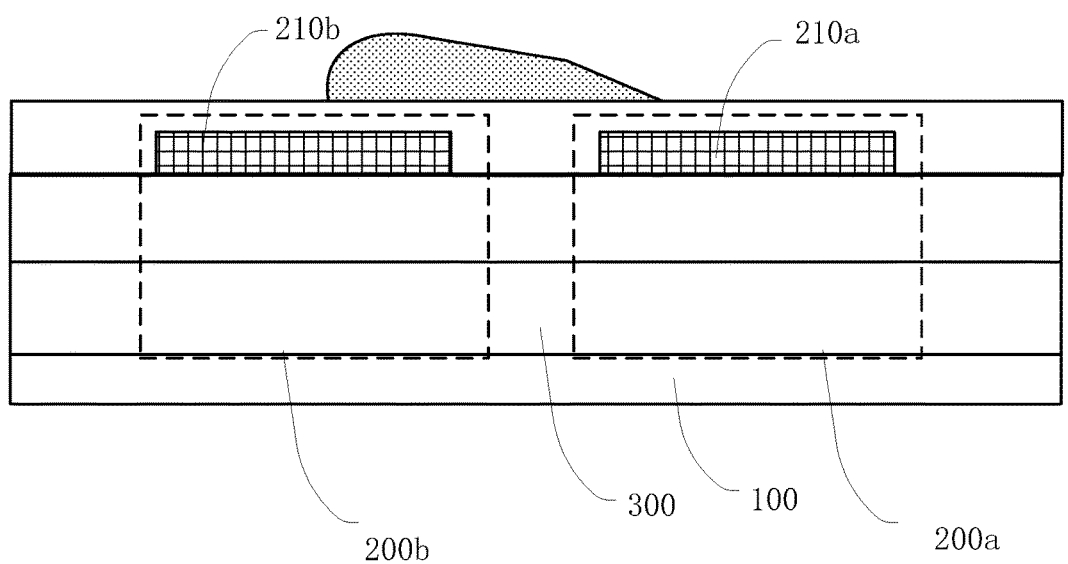
FIG. 16 illustrates a schematic cross-sectional view of the electrowetting panel shown in FIG. 11 along an H-H' direction.
Figure 17:
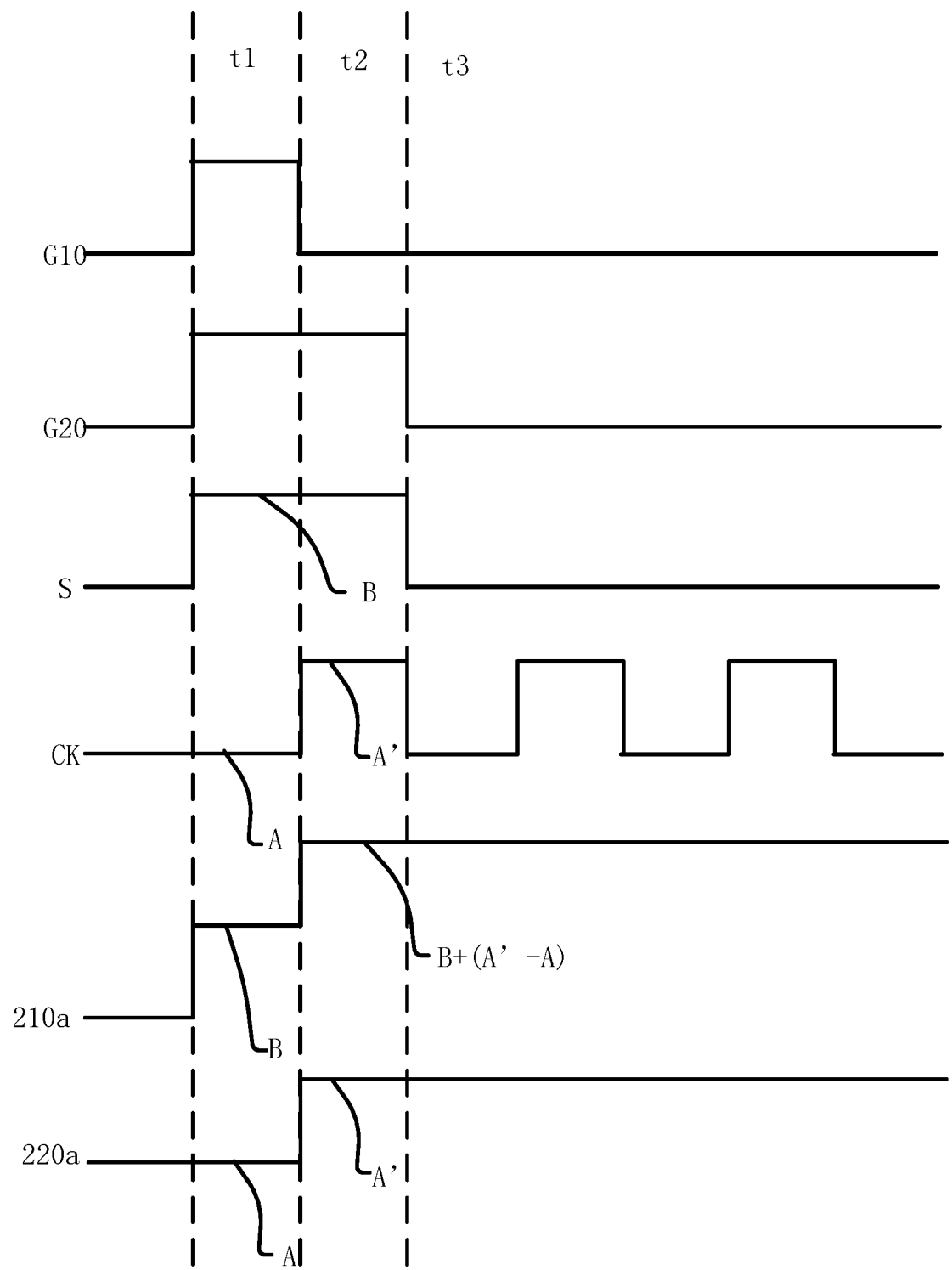
FIG. 17 illustrates a driving sequence diagram corresponding to a first driving unit shown in FIG. 16.
Figure 18:
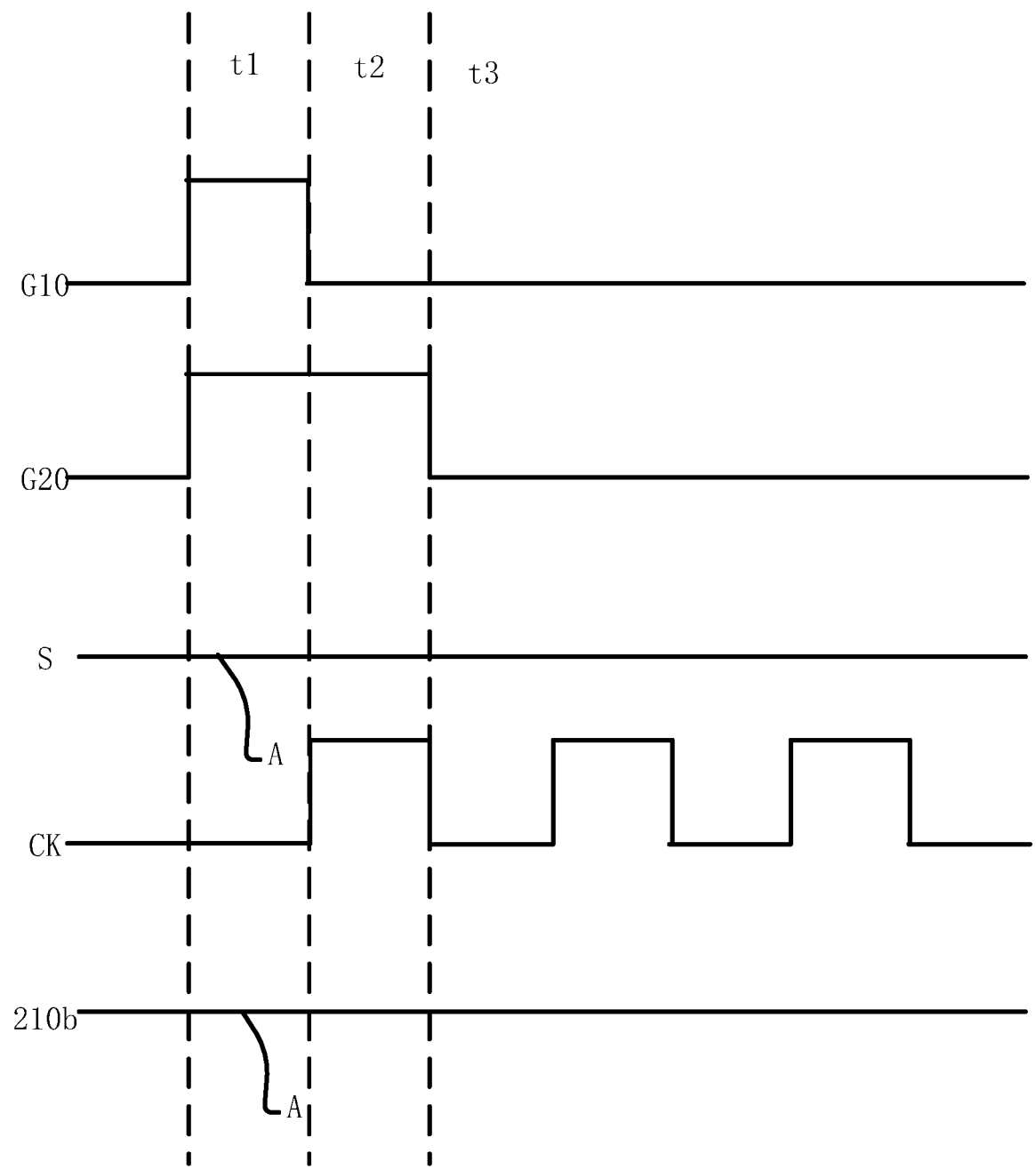
FIG. 18 illustrates a driving sequence diagram corresponding to a second driving unit shown in FIG. 16.

The present disclosure further provides a driving method for an electrowetting panel. FIG. 16 illustrates a schematic cross-sectional view of the electrowetting panel shown in FIG. 11 along an H-H' direction, FIG. 17 illustrates a driving sequence diagram corresponding to a first driving unit shown in FIG. 16, and FIG. 18 illustrates a driving sequence diagram corresponding to a second driving unit shown in FIG. 16.

Referring to FIGS. 11 and 16-18, the driving method may be applied to an electrowetting panel consistent with various embodiments of the present disclosure. The driving method may include changing the electric potentials of the signals connected to the date lines S in two adjacent driving units 200 to generate an electric potential difference between the driving electrodes 210 in the two adjacent driving units 200, such that an electric field formed between the two adjacent driving electrodes 210 on the electrowetting panel may drive droplets to move between the two driving electrodes 210.

In FIG. 16, a droplet is shown as an example to illustrate the movement of the droplet between the two driving units 200 (e.g. a first driving unit 200a including a first driving electrode 210a, and a second driving unit 200b including a second driving electrode 210b) driven by an electric field formed between the two driving electrodes.

In the first driving unit 200a, during a first time period t1, a first scanning line G10 that is electrically connected to the first driving unit 200a may send a high electric-potential signal to the gate electrode of the first transistor T1, such that the first transistor T1 may operate in the on state. A high electric-potential signal B (e.g., signal B) of a data line S that is electrically connected to the first driving unit 200a may be transmitted to the first driving electrode 210a through the first transistor T1, such that the electric potential at the first driving electrode 210a may be B. A second scanning line G20 that is electrically connected to the first driving unit 200a may send a high electric-potential signal to the gate electrode of the second transistor T2, such that the second transistor T2 may operate in the on state. The high electric-potential signal of the data line S may be transmitted to the gate electrode of the third transistor T3 through the second transistor T2, such that the third transistor T3 may operate in the on state. A low electric-potential signal A of the common signal line CK may be transmitted to the first electrode 220a of the first driving unit 200a through the third transistor T3. At this time, the voltage difference between the first driving electrode 210a and the first electrode 220a may be (B-A).

During a second time period t2, the first scanning line G10 that is electrically connected to the first driving unit 200a may send a low electric-potential signal to the gate electrode of the first transistor T1, such that the first transistor T1 may operate in the off state. Therefore, the transmission of the signal of the data line S to the first driving electrode 210a through the first transistor T1 may be blocked, and thus the electric potential of the signal at the first driving electrode 210a may be locked. The second scanning line G20 that is electrically connected to the first driving unit 200a may continue to send the high electric-potential signal to the gate electrode of the second transistor T2, such that the second transistor T2 may remain in the on state. The high electric-potential signal of the data line S that is electrically connected to the first driving unit 200a may be transmitted to the gate electrode of the third transistor T3 through the second transistor T2, such that the third transistor T3 may operate in the on state. A high electric-potential signal A' (e.g. signal A') may be sent to the common signal line CK and the high electric-potential signal A' may be transmitted to the first electrode 220a of the first driving unit 200a through the third transistor T3. Because A'>A and the voltage difference between the two terminals of the first capacitor C1 remains unchanged, the electric potential at the first driving electrode 210a may be raised to (B+(A'-A)).

During a third time period t3, the data line S that is electrically connected to the first driving unit 200a may be sent in a low electric-potential signal, and the low electric-potential signal at the data line S may be transmitted to the gate electrode of the third transistor T3 through the second transistor T2, such that the third transistor T3 may operate in the off state. Therefore, the transmission of the signal of the common signal line CK to the first electrode 220a of the first driving unit 200a through the third transistor T3 may be blocked, and thus the electric potential of the signal at first electrode 220a may be locked. The second scanning line G20 that is electrically connected to the first driving unit 200a may send a low electric-potential signal to the gate electrode of the second transistor T2, such that the second transistor T2 may operate in the off state. Therefore, a low electric-potential signal may be locked on the gate electrode of the third transistor T3. As such, the electric potential at the first driving electrode 210a may remain at (B+(A'-A)).

In the second driving unit 200b, during the first time period t1 and the second time period t2, a data line S that is electrically connected to the second driving unit 200b may send in a low electric-potential signal A (e.g., an electric potential of the signal is A), and the electric potential of the second driving electrode 210b may remain at A.

Therefore, an electric field penetrating through the droplet may be formed between the first driving electrode 210a and the second driving electrode 210b. Because the droplet may be an electrically conductive liquid, the droplet may be able to move from a position above the second driving electrode 210b to a position above the first driving electrode 210a.

It should be noted that, for illustrative purposes, the cross-sectional view in FIG. 16 only schematically shows a part of the film-layer structure of the disclosed electrowetting panel, and for other parts of the film-layer structure of the electrowetting panel, reference may be made to FIGS. 13-14 as well as the corresponding description provided in above embodiments.

The disclosed electrowetting panel can be applied to a microfluidic chip based on the dielectric wetting technique. Due to the electric potential difference between adjacent driving units 200, an electric field can be formed. Further, under the effect of the electric field, a pressure difference and an asymmetric deformation may be generated inside the droplet, thereby driving the droplet to move in a certain direction. The disclosed driving method for the electrowetting panel can ensure a sufficiently large electric potential difference between two adjacent driving units 200, and thus is capable of providing a large driving voltage for achieving normal movement of the droplet.

It should be noted that the droplet is an electrically conductive liquid, including a biological sample or a chemical substance composed of a single component or a plurality of components. Moreover, in one embodiment, the droplet is described to carry negative charges for illustration, and the moving direction of the droplet is opposite to the direction of the electric field. In other embodiments, the droplet may carry positive charges, and thus accordingly, the moving direction of the droplet is consistent with the direction of the electric field. Further, in one embodiment, it is described that the electrowetting panel can be applied to microfluidic chips that require large driving voltages. However, the environment that the disclosed electrowetting panel can be applied to is not limited to the situation, and the disclosed electrowetting panel can also be applied to other structures where providing high driving voltages is needed.

Further, referring to FIGS. 11 and 16, in one embodiment, the electric potential difference between the driving electrodes 210 of two driving units 200 may be in a range of approximately 30 V to 60 V.

In one embodiment, when the disclosed electrowetting panel is applied to a microfluidic chip based on the dielectric wetting technique, the normal driving voltage required for droplet to move may be affected by many factors in the manufacturing process. Each chip may have a specific normal driving threshold, and when the electric potential difference between adjacent driving electrodes 210 is greater than or equal to the driving threshold voltage, the droplet may then be able to be deformed and move. Therefore, in one embodiment, by defining the electric potential difference between the driving electrodes 210 of two driving units 200 in a range of approximately 30 V to 60 V, the droplet may be ensured to move normally over the electrowetting panel.

Compared to existing driving circuits and the corresponding driving methods, and existing electrowetting panels and the corresponding driving methods, the disclosed driving circuit and the corresponding driving method as well as the disclosed electrowetting panel and the corresponding driving method may be able to achieve at least the following beneficial effects.

According to the disclosed driving circuit, during a first time period, the disclosed driving circuit controls the first module to operate in the on state by inputting a signal through the first signal-input terminal, transmits the signal at the third signal-input terminal to the first terminal of the first capacitor through the first module, controls the second module to operate in the on state by inputting a signal through the second signal-input terminal, transmits the signal at the third signal-input terminal to the third module through the second module, and controls the third module to operate in the on state by inputting a signal through the third signal-input terminal. As such, the signal at the fourth signal-input terminal is transmitted to the second terminal of the first capacitor through the third module, such that a voltage difference is generated between the first terminal and the second terminal of the first capacitor. Then, during a second time period, the disclosed driving circuit controls the first module to operate in the off state by inputting a signal through the first signal-input terminal, blocks the transmission of the signal at the third signal-input terminal to the first terminal of the first capacitor through the first module, such that the electric potential of the signal at the first terminal of the first capacitor is locked, transmits the signal at the fourth signal-input terminal to the second terminal of the first capacitor through the third module. Because the signal at the fourth signal-input terminal at current time is higher than the signal at the fourth signal-input terminal during the first time period, and the voltage difference between the two terminals of the first capacitor remains unchanged, the electric potential of the signal at the first terminal of the first capacitor is further improved. During a third time period, the disclosed driving circuit transmits the signal at the third signal-input terminal to the third module through the second module, controls the third module to operate in the off state by inputting a signal through the third signal-input terminal, and blocks the transmission of the signal at the fourth signal-input terminal to the second terminal of the first capacitor through the third module, so that the electric potential of the signal at the second terminal of the first capacitor is locked. Therefore, the signal-output terminal that is electrically connected to the first terminal of the first capacitor outputs a high electric-potential signal. As such, the function of low voltage input and high voltage output may be achieved in the driving circuit, which is conducive to realizing the voltage-boosting circuit. Moreover, the disclosed driving circuit can be applied to microfluidic devices. When a large number of driving electrodes needs to be disposed in a microfluidic device in order to simultaneously perform a large quantities of chemical micro-reaction or substance detection, the driving chip for providing the driving signals may not need to be provided with a lot of signal channels. Therefore, while facilitating the reduction of the computational difficulty of the driving chip, the disclosed driving circuit is also able to provide a sufficiently high driving voltage for the droplet to move normally.

The above detailed descriptions only illustrate certain exemplary embodiments of the present disclosure, and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A driving circuit, comprising:
    a voltage-boosting unit, including a first module, a second module, a third module, and a first capacitor; and
    a first signal-input terminal, a second signal-input terminal, a third signal-input terminal, a fourth signal-input terminal, and a signal-output terminal electrically connected to the voltage-boosting unit, wherein:
        the first module is electrically connected to the first signal-input terminal, the third signal-input terminal, and a first terminal of the first capacitor, and is configured to, during a first time period, transmit a signal at the third signal-input terminal to the first terminal of the first capacitor, and during a second time period, block transmission of the signal at the third signal-input terminal to the first terminal of the first capacitor to lock an electric potential of a signal at the first terminal of the first capacitor,
        the second module is electrically connected to the second signal-input terminal, the third signal-input terminal, and the third module, and is configured to, during the first time period and the second time period, transmit the signal at the third signal-input terminal to the third module, and during a third time period, block transmission of the signal at the third signal-input terminal to the third module,
        the third module is electrically connected to the second signal-input terminal, the second module, and a second terminal of the first capacitor, and is configured to, during the first time period and the second time period, transmit a signal at the fourth signal-input terminal to the second terminal of the first capacitor to raise the electric potential of the signal at the first terminal of the first capacitor, and during the third time period, block transmission of the signal at the fourth signal-input terminal to the second terminal of the second capacitor to lock an electric potential of a signal at the second terminal of the first capacitor, and
        the first terminal of the first capacitor is electrically connected to the signal-output terminal for outputting a high electric-potential signal.

2. The driving circuit according to claim 1, wherein:
    the first module includes a first transistor, wherein a gate electrode of the first transistor is electrically connected to the first signal-input terminal, a first electrode of the first transistor is electrically connected to the third signal-input terminal, and a second electrode of the first transistor is electrically connected to the first terminal of the first capacitor;
    the second module includes a second transistor, wherein a gate electrode of the second transistor is electrically connected to the second signal-input terminal, and a first electrode of the second transistor is electrically connected to the third signal-input terminal; and
    the third module includes a third transistor, wherein a gate electrode of the third transistor is electrically connected to a second electrode of the second transistor, a first electrode of the third transistor is electrically connected to the fourth signal-input terminal, and a second electrode of the third transistor is electrically connected to the second terminal of the first capacitor.

3. The driving circuit according to claim 2, wherein:
the first module further includes a fourth transistor, wherein a gate electrode of the fourth transistor is electrically connected to the gate electrode of the first transistor, a first electrode of the fourth transistor is electrically connected to the second electrode of the first transistor, and a second electrode of the fourth transistor is electrically connected to the first terminal of the first capacitor;
the second module further includes a fifth transistor, wherein a gate electrode of the fifth transistor is electrically connected to the gate electrode of the second transistor, a first electrode of the fifth transistor is electrically connected to the second electrode of the second transistor, and a second electrode of the fifth transistor is electrically connected to the gate electrode of the third transistor; and
the third module further includes a sixth transistor, wherein a gate electrode of the sixth transistor is electrically connected to the gate electrode of the third transistor, a first electrode of the sixth transistor is electrically connected to the second electrode of the third transistor, and a second electrode of the sixth transistor is electrically connected to the second terminal of the first capacitor.

4. The driving circuit according to claim 2, wherein:
the first transistor, the second transistor, and the third transistor are all N-type transistors.

5. The driving circuit according to claim 2, wherein:
the first transistor and the second transistor are P-type transistors, and the third transistor is an N-type transistor.

6. The driving circuit according to claim 2, further including a voltage-stabilizing unit, wherein:
the voltage-stabilizing unit is electrically connected to the voltage-boosting unit, and is configured to stabilize the electric potential of the signal at the second terminal of the first capacitor, and ensure the first terminal of the first capacitor maintaining a high electric-potential output.

7. The driving circuit according to claim 6, wherein:
the voltage-stabilizing unit includes a second capacitor and a third capacitor, wherein:
a first terminal of the second capacitor is electrically connected to the gate electrode of the third transistor, a second terminal of the second capacitor is grounded, and the second capacitor is configured to stabilize a signal at the gate electrode of the third transistor; and
a first terminal of the third capacitor is electrically connected to the first terminal of the first capacitor, a second terminal of the third capacitor is grounded, and the third capacitor is configured to stabilize the signal at the second terminal of the first capacitor.

\* \* \* \* \*